United States Patent
Xin et al.

(10) Patent No.: US 12,452,115 B2
(45) Date of Patent: Oct. 21, 2025

(54) DATA TRANSMISSION FOR LOW POWER INDOOR WIRELESS NETWORK

(71) Applicant: Huawei Technologies Co., Ltd., Shenzhen (CN)

(72) Inventors: Yan Xin, Kanata (CA); Jung Hoon Suh, Ottawa (CA); Guido Montorsi, Turin (IT); Sergio Benedetto, Turin (IT); Osama Aboul-Magd, Ottawa (CA); Wei Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 18/131,855

(22) Filed: Apr. 6, 2023

(65) Prior Publication Data

US 2023/0308326 A1 Sep. 28, 2023

Related U.S. Application Data

(63) Continuation of application No. PCT/CN2020/120244, filed on Oct. 10, 2020.

(51) Int. Cl.
H04L 27/26 (2006.01)
H04L 1/00 (2006.01)

(52) U.S. Cl.
CPC ........ *H04L 27/2601* (2013.01); *H04L 1/0057* (2013.01)

(58) Field of Classification Search
CPC . H04L 27/2601; H04L 1/0057; H04L 1/0041; H04L 1/08; Y02D 30/70
See application file for complete search history.

(56) References Cited

U.S. PATENT DOCUMENTS

| | | |
|---|---|---|
| 2015/0195115 A1 | 7/2015 | Yu et al. |
| 2016/0087766 A1 | 3/2016 | Sun et al. |
| 2018/0167165 A1* | 6/2018 | Kons ............ H04L 1/0045 |
| 2020/0106575 A1 | 4/2020 | Masal et al. |
| 2021/0099329 A1* | 4/2021 | Hellfajer ........ H04L 27/2657 |

FOREIGN PATENT DOCUMENTS

| | | |
|---|---|---|
| CN | 102461036 A | 5/2012 |
| WO | 2018140210 A1 | 8/2018 |
| WO | 2020143019 A1 | 7/2020 |

OTHER PUBLICATIONS

Federal Communications Commission FCC 20-51 "In the Matter of Unlicensed Use of the 6 GHz Band—Expanding Flexible Use in Mid-Band Spectrum Between 3.7 and 24 GHzA1", Apr. 2020.
R. Porat, "6GHz LPI Range Extension", IEEE 802.11-20/965r4, Aug. 2020.

(Continued)

*Primary Examiner* — David S Huang

(57) ABSTRACT

Method and system method comprising encoding a source word to be transmitted in a data unit from a source station in a wireless network, generating a first OFDM symbol that carries a data segment corresponding to encoded bits of the source word, duplicating the first OFDM symbol to generate a second OFDM symbol that is a linear phase-rotated copy of the first OFDM symbol; and transmitting the data unit including the first OFDM symbol and the second OFDM symbol.

8 Claims, 15 Drawing Sheets

(56) References Cited

OTHER PUBLICATIONS

J. Liu et al. "DCM for range extension in 6GHz LPI", IEEE 802.11-20/986r1, Mar. 2020.
"IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN," in IEEE P802.11ax/D6.0, pp. 1-780, Nov. 2019.
D. Divsalar et al., "Capacity-Approaching Protograph Codes", IEEE Journal of Selected Area in Communications, pp. 876-888, Aug. 2009.
R. Porat et al. "DUP mode PAPR Reduction" IEEE 802.11-20/1191r1, Sep. 2020.
"Annex F—HT LDPC matrix definitions" of IEEE Draft P802.11REVmd D4.0, Aug. 2020.

* cited by examiner

Interleaver permutation table π(i) for i = 0 to 15, with associated rate. The row i=1 (π(1)) is highlighted with a dashed box.

| i | Rate | j=0 | 1 | 2 | 3 | 4 | 5 | 6 | 7 | 8 | 9 | 10 | 11 | 12 | 13 | 14 | 15 | 16 | 17 | 18 | 19 |
|---|------|-----|---|---|---|---|---|---|---|---|---|----|----|----|----|----|----|----|----|----|----|
| 0 | 0.833 |   |   |   |   |   |   |   |   |   |   |    |    |    |    |    |    |    |    |    |    |
| 1 | 0.714 | 7 | 5 | 3 | 8 | 6 | 4 | 9 | 1 | 2 | 0 | 13 | 19 | 11 | 18 | 14 | 12 | 17 | 16 | 15 | 10 |
| 2 | 0.625 | 1 | 7 | 0 | 5 | 8 | 6 | 9 | 7 | 4 | 14 | 10 | 19 | 13 | 2 | 11 | 13 | 15 | 12 | 3 | 18 |
| 3 | 0.556 | 16 | 6 | 0 | 1 | 19 | 4 | 7 | 17 | 8 | 1 | 12 | 19 | 10 | 11 | 13 | 10 | 2 | 15 | 3 | 15 |
| 4 | 0.500 | 17 | 11 | 0 | 9 | 6 | 0 | 4 | 5 | 8 | 9 | 18 | 3 | 18 | 15 | 14 | 7 | 12 | 13 | 10 | 16 |
| 5 | 0.455 | 4 | 3 | 8 | 19 | 18 | 6 | 16 | 10 | 14 | 7 | 2 | 19 | 13 | 15 | 1 | 5 | 13 | 4 | 10 | 11 |
| 6 | 0.417 | 3 | 8 | 6 | 9 | 9 | 0 | 0 | 13 | 11 | 9 | 17 | 3 | 7 | 15 | 12 | 18 | 2 | 10 | 13 | 1 |
| 7 | 0.385 | 5 | 17 | 4 | 19 | 8 | 3 | 4 | 2 | 6 | 7 | 5 | 12 | 17 | 14 | 1 | 15 | 4 | 13 | 10 | 2 |
| 8 | 0.357 | 19 | 8 | 2 | 0 | 9 | 6 | 5 | 8 | 14 | 9 | 18 | 15 | 2 | 11 | 12 | 18 | 10 | 4 | 13 | 15 |
| 9 | 0.333 | 9 | 8 | 16 | 1 | 3 | 4 | 1 | 3 | 3 | 5 | 2 | 1 | 15 | 1 | 13 | 14 | 18 | 10 | 13 | 11 |
| 10 | 0.313 | 4 | 2 | 10 | 11 | 14 | 16 | 13 | 2 | 19 | 7 | 17 | 14 | 3 | 11 | 6 | 7 | 13 | 15 | 18 | 15 |
| 11 | 0.294 | 9 | 13 | 5 | 4 | 2 | 7 | 3 | 8 | 1 | 6 | 7 | 10 | 16 | 1 | 12 | 14 | 11 | 10 | 3 | 10 |
| 12 | 0.278 | 11 | 9 | 0 | 18 | 10 | 4 | 4 | 3 | 13 | 19 | 10 | 15 | 15 | 19 | 5 | 5 | 17 | 5 | 8 | 6 |
| 13 | 0.263 | 2 | 12 | 6 | 7 | 1 | 18 | 9 | 1 | 3 | 1 | 14 | 19 | 16 | 8 | 4 | 3 | 11 | 11 | 18 | 0 |
| 14 | 0.25 | 11 | 5 | 3 | 14 | 15 | 1 | 7 | 18 | 8 | 10 | 19 | 16 | 16 | 13 | 0 | 17 | 5 | 12 | 2 | 15 |
| 15 | 0.238 | 9 | 0 | 5 | 1 | 17 | 4 | 16 | 7 | 14 | 3 | 8 | 10 | 13 | 6 | 2 | 12 | 19 | 11 | 15 | 11 |

FIG. 13

DATA TRANSMISSION FOR LOW POWER INDOOR WIRELESS NETWORK

RELATED APPLICATIONS

The present application is a continuation of International Patent Application No. PCT/CN2020/120244, filed Oct. 10, 2020, the contents of which are incorporated herein by reference.

TECHNICAL FIELD

The present application relates to air interface technologies, in particular to methods and systems for low power data transmissions.

BACKGROUND

The Institute of Electrical and Electronics Engineers (IEEE) 802.11 standards are a group of media access control (MAC) and physical layer (PHY) specification standards for implementing Wi-Fi™ wireless local area network (WLAN) communication. The 802.11 standards have experienced steady development and continue to be developed to meet the ever increasing demand for enhanced throughput, reduced latency and jitter, higher reliability, and improved power efficiency driven by new and emerging applications including virtual or augmented reality, immersive gaming, remote office support and cloud computing.

IEEE 802.11be (Extremely High Throughput (EHT)), is currently under development by the IEEE 802.11 Task Group TGbe, and will be the next major IEEE 802.11 amendment to define the next generation of Wi-Fi after IEEE 802.11ax (High Efficiency (HE)) ((currently IEEE Draft P802.11ax_D6.0). The modulation and coding schemes (MCS) defined in HE will be reused in EHT. EHT will be designed to take advantage of the 6 GHz frequency band that has been opened up by the United States Federal Communications Commission (FCC) for unlicensed use.

The entire 6 GHz frequency band will be available for unlicensed low power indoor (LPI) operation without automated frequency coordination (AFC) controlled access, providing a potential for deployment of next generation Wi-Fi to use channels with bandwidth up to 320 MHZ. Since other licensed incumbent services such as fixed and mobile services and fixed-satellite services also operate in the 6 GHz band, the FCC has defined rules for unlicensed LPI operation to prevent harmful interference to incumbent services. The rules limit LPI to indoor operation only, require a contention-based protocol, and enforce low power operations.

Enabling low-power indoor (LPI) devices to operate across the entire 6 GHz band is fundamental to the success of the 6 GHz proceeding. Because of their low power and their indoor operation, these devices do not require Automated Frequency Coordination (AFC) and can operate in all four sub-bands while protecting licensed operations.

However, the Effective Isotropically Radiated Power (EIRP) Power Spectral Density (PSD) requirements for LPI stations such as LPI access points (APs) and LPI Non-AP stations (STAs) in the 6 GHz frequency band are far more stringent than those in the 2.4 GHz and 5 GHz frequency bands. For example, an LPI AP in the 6 GHz band is permitted a maximum EIRP PSD of 5 dBm/MHz compared to the 17 dBm/MHz in the 5 GHz band; and LPI STAs are permitted a maximum of EIRP PSD of −1 dBm/MHz in the 6 GHz band compared to 11 dBm/MHz in the 5 GHz band. Accordingly, LPI APs and STAs in the 6 GHz band have a much shorter range (i.e. approximately a quarter) and small coverage area than their counterparts in the 5 GHz band.

There is a need for LPI devices and transmission techniques that mitigate the above described range and coverage issues that arise due to the constraints that have been placed on 6 GHz LPI Wi-Fi.

SUMMARY

According to a first example aspect a method is disclosed that includes: encoding a source word to be transmitted in a data unit from a source station in a wireless network; generating a first OFDM symbol that carries a data segment corresponding to encoded bits of the source word; duplicating the first OFDM symbol to generate a second OFDM symbol that is a linear phase-rotated copy of the first OFDM symbol; and transmitting the data unit including the first OFDM symbol and the second OFDM symbol.

According to example embodiments of the first example aspect, the method includes: mapping the encoded bits to both a first set of modulated symbols and a second set of modulated symbols, wherein generating the first OFDM symbol comprises mapping the first set of modulated symbols to a first set of frequency subcarriers corresponding to the first OFDM symbol and mapping the second set of modulated symbols to a second set of frequency subcarriers corresponding to the first OFDM symbol and performing an inverse Fast Fourier transform operation on the frequency subcarriers.

In example embodiments of one or more of the above aspects, mapping the encoded bits comprises applying a phase rotation to the second set of modulated symbols relative to the first set of modulated symbols.

In example embodiments of one or more of the above aspects, the method includes: duplicating the first set of modulated symbols and the second set of modulated symbols to provide a third set of modulated symbols and a fourth set of modulated symbols, wherein all four sets of modulated symbols each respectively compose the data segment; and generating the first OFDM symbol comprises, prior to performing the inverse Fast Fourier transform operation, mapping the third set of modulated symbols to a third set of frequency subcarriers corresponding to the first OFDM symbol and mapping the fourth set of modulated symbols to a fourth set of frequency subcarriers corresponding to the first OFDM symbol.

According to a second example aspect, a method is disclosed that includes: encoding a source word to provide a first codeword that includes information bits from the source word and a first set of parity bits; generating a first OFDM symbol that carries a first data segment corresponding to information bits of the source word and the first set of parity bits; permuting the information bits of the source word to provide a permuted set of information bits; encoding the permuted set of information bits of the source word to provide a second codeword that includes the permuted set of information bits of the source word and a second set of parity bits; generating a second OFDM symbol that carries a second data segment corresponding to the information bits of the source word and the second set of parity bits; and transmitting, in a wireless network, a data unit including the first OFDM symbol and the second OFDM symbol.

According to an example embodiment of the second aspect, the method comprises: mapping bits of the first data segment to two respective sets of modulated symbols, wherein generating the first OFDM symbol comprises mapping one of the sets of modulated symbols to a first set of frequency subcarriers of the first OFDM symbol and mapping the other of the modulated symbols to a second set of frequency subcarriers of the first OFDM symbol and performing an inverse Fast Fourier transform operation on the frequency subcarriers of the first OFDM symbol; and mapping bits of the second data segment to both a first set of modulated symbols and a second set of modulated symbols, wherein generating the second OFDM symbol comprises mapping the first set of modulated symbols to a first set of frequency subcarriers of the second OFDM symbol and mapping the second set of modulated symbols to a second set of frequency subcarriers of the second OFDM symbol and performing an inverse Fast Fourier transform operation on the frequency subcarriers of the second OFDM symbol.

According to a third example aspect, a method is disclosed that includes encoding a source word to provide a first codeword that includes information bits from the source word and a first set of parity bits; mapping a first data segment, corresponding to the information bits from the source word and a first set of parity bits, to both a first set of modulated symbols and a second set of modulated symbols; permuting the information bits of the source word to provide a permuted set of information bits; encoding the permuted set of information bits to provide a second codeword that includes the permuted information bits from the source word and a second set of parity bits; mapping a second data segment, corresponding to the information bits from the source word and the second set of parity bits, to both a third set of modulated symbols and a fourth set of modulated symbols, wherein the first, second, third and fourth sets of modulated symbols all carry the same information bits of the source word; mapping the first set of modulated symbols to a first set of frequency subcarriers of an OFDM symbol, mapping the second set of modulated symbols to a second set of frequency subcarriers of the OFDM symbol, mapping the third set of modulated symbols to a third set of frequency subcarriers of the OFDM symbol, and mapping the fourth set of modulated symbols to a fourth set of frequency subcarriers of the OFDM symbol; performing an inverse Fast Fourier transform operation on the frequency subcarriers to generate the OFDM symbol; and transmitting, in a wireless network, a data unit including the OFDM symbol.

According to example embodiments of the second and third aspects, the first codeword is a first low density parity check (LDPC) codeword that conforms to a first parity check matrix, and the second codeword is a second LDPC codeword that conforms to a second parity check matrix, wherein the second parity check matrix is derived by permuting locations of columns in the first parity check matrix that correspond to information bits and copying a portion of the first parity matrix that corresponds to parity check bits.

According to fourth example aspect, a method is disclosed that includes generating a first low density parity check (LPDC) codeword for a source word for a first transmission, the first LDPC codeword including information bits of the source word and a first set of parity bits; permuting the information bits of the source word; generating a second LDPC codeword for a retransmission, the second LDPC codeword including the permuted bits of the source word and a second set of parity check bits corresponding to the permuted information bits, wherein the first LDPC codeword conforms to a first parity check matrix and the second LDPC codeword conforms to a second parity check matrix that is derived by permuting locations of columns in the first parity check matrix that correspond to information bits and copying a portion of the first parity matrix that corresponds to parity check bits.

According to example embodiments of one or more of the preceding aspects, permuting the information bits of the source word is performed based on a predefined permutation map.

According to a further examples aspect, a method is disclosed for encoding a physical layer (PHY) protocol data unit (PPDU) for low power indoor (LPI) wireless communication, the method comprising: encoding, using binary phase shift keying (BPSK), a first set of information bits for a first universal signal field (U-SIG 1) in a preamble of the PPDU, the first set of information bits including information about a payload of the PPDU; encoding, using quadrature binary phase shift keying (QBPSK), a second set of information bits for a second universal signal field (U-SIG 2) in a preamble of the PPDU, the second set of information bits including further information about the payload of the PPDU; encoding, using QBPSK, the first set of information bits for a third universal signal field (RU-SIG 1) in a preamble of the PPDU; encoding, using BPSK, the second set of information bits for a fourth universal signal field (RU-SIG 2) in a preamble of the PPDU; and transmitting, in a wireless network, the PPDU.

In some examples, the BPSK encoded first set of information bits are carried in a first OFDM symbol, the QBPSK encoded second set of information bits are carried in a second OFDM symbol adjacent the first OFDM symbol, the QBPSK encoded first set of information bits are carried in a third OFDM symbol adjacent the second OFDM symbol, and the BPSK encoded fourth set of information bits are carried in a fourth OFDM symbol adjacent the third OFDM symbol.

According to a further example aspect, a method is disclosed that comprises: assembling a preamble for a physical layer (PHY) protocol data unit (PPDU) for low power indoor (LPI) wireless communication, the preamble including: a first universal signal field (U-SIG 1) carrying a BPSK encoded first set of information bits including information about a payload of the PPDU; a second universal signal field (U-SIG 2) carrying a BPSK encoded second set of information bits including further information about the payload of the PPDU; a third universal signal field (RU-SIG 1) carrying a copy of the BPSK encoded first set of information bits; a fourth universal signal field (RU-SIG 1) carrying a copy of the BPSK encoded second set of information bits; and transmitting, in a wireless network, the PPDU including the assembled preamble.

In some examples, the universal signal fields are each carried in respective OFDM symbols.

In some examples, the preamble is a greenfield preamble that does not include any legacy fields.

According to a further example aspect, a wireless transmitting station is disclosed that is configured to perform the method of any of the preceding aspects.

According to a further example aspect, a non-volatile computer readable medium is disclosed that stores instructions for configuring a wireless transmitting station to perform the method of any of the preceding aspects.

BRIEF DESCRIPTION OF THE DRAWINGS

Reference will now be made, by way of example, to the accompanying figures which show example embodiments of the present application, and in which:

FIG. 10B illustrates an example of base parity check matrix (PCM) Hb (4×24) for coding rate 5/6 LDPC code with n=1944 and Z=81, and an identity matrix together with illustrative cyclic shifted versions for the simplified case where Z=4.

FIG. 12 illustrates a table that defines a set of permutation maps that correspond to base PCM $H_b$ for coding rate 5/6 LDPC code with n=1944 and Z=81.

FIG. 13 shows an example of original base PCM $H_b(0)$ and an extension base PCM $H_b(1)$.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure teaches methods, devices, and systems for transmitting data in an LPI wireless network. As noted above, regulatory regimes that will apply to next generation LPI WLAN systems, including for example next generation LPI Wi-Fi systems that operate in the 6 GHz band, will permit a large potential bandwidth but place regulatory constraints that effectively limit the power and range of devices used in such systems. Example embodiments are disclosed that are directed to enabling optimized device and transmission performance in view of these regulatory constraints.

Figure 1:
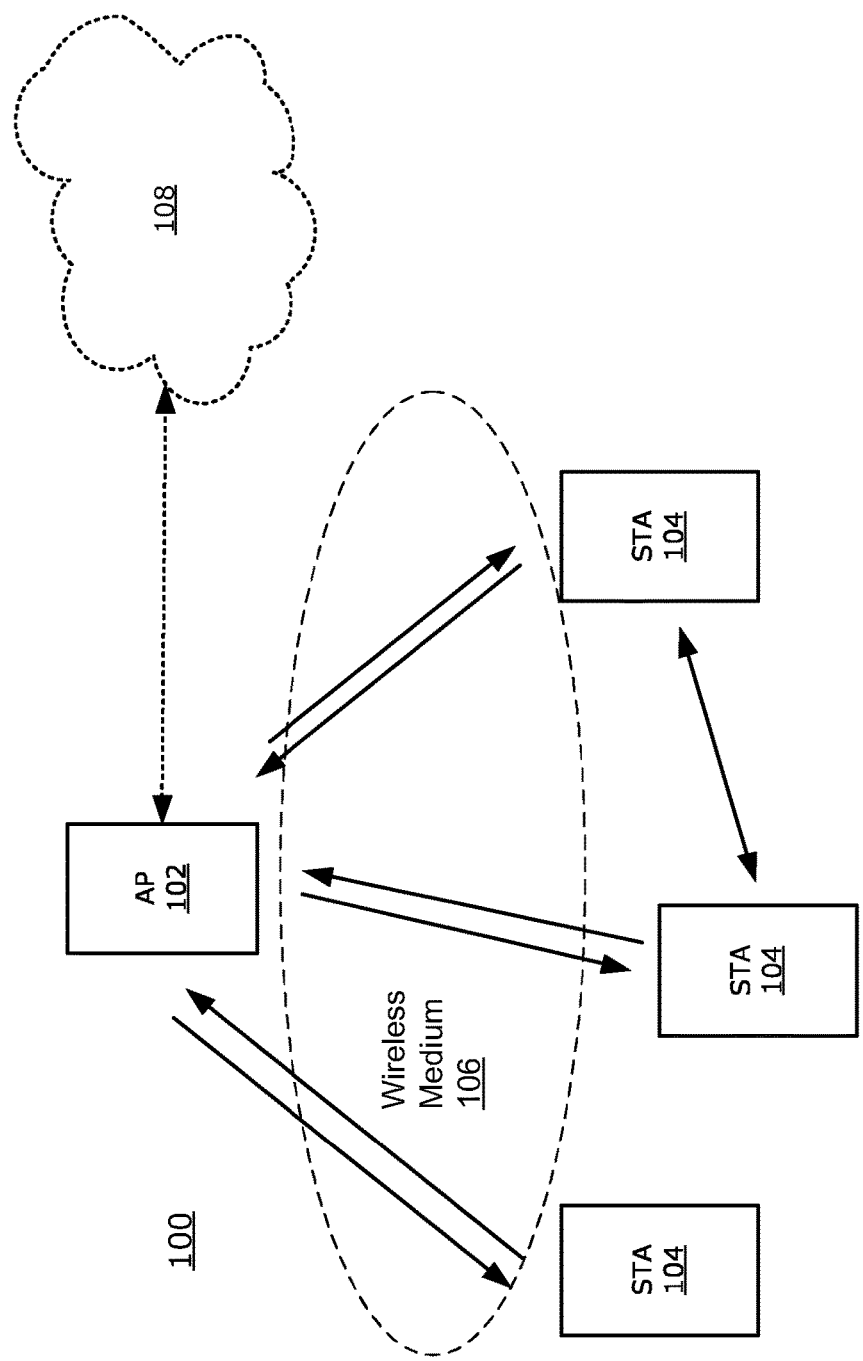
FIG. 1 is a block diagram illustrating an example communication network in accordance with one implementation of the present disclosure.

An example of a communication network 100 in which the devices and methods described below can operate will be described with reference to FIGS. 1 and 2. As illustrated in FIG. 1, network 100 comprising a plurality of communications devices that can include fixed, portable, and moving devices (referred to as stations). The example of FIG. 1 illustrates a single fixed access point station (AP) 102, and a plurality of non-AP stations (STAs) 104 that may be portable or mobile. In at least some examples, network 100 is a next generation LPI Wi-Fi compliant network that operates in accordance with one or more protocols from the 802.11 standards, such as protocols specified in IEEE 802.11be (EHT), for example. WLAN 106 may be configured to support OFDM transmission techniques.

Each STA 104 may be a laptop, a desktop PC, PDA, Wi-Fi phone, wireless transmit/receive unit (WTRU), mobile station (MS), mobile terminal, smartphone, mobile telephone, sensor, internet of things (IoT) device, or other wireless enabled computing or mobile device. In some embodiments, STA 104 may be a LPI enabled device that can function indoors where signal transmissions may be subjected to attenuation from indoor structures such as walls. In some embodiments, a STA 104 comprises a machine which has the capability to send, receive, or send and receive data in the WLAN 106 but which performs primary functions other than communications. In some embodiments, a machine includes an apparatus or device with means to transmit and/or receive data through network 100 but such apparatus or device is not typically operated by a user for the primary purpose of communications.

The AP 102 may comprise a bi-directional network access interface which functions as a wireless transmission and/or reception point for STAs 104 in the network 100. The AP 102 may be connected to a backhaul network 108 which enables data to be exchanged between the AP 102 and other remote networks (including for example the Internet), nodes, APs, and devices (not shown). The AP 102 may support communications through an unlicensed radio frequency wireless medium 106 with each STA 104 by establishing uplink and downlink communications channels with each STA 104, as represented by the arrows in FIG. 1. In some examples, STAs 104 may be configured to communicate with each other. Communications in the network 100 may be unscheduled, scheduled by the AP 102 or by a further scheduling or management entity in the network 100, or a mix of scheduled and unscheduled communications.

Figure 2:
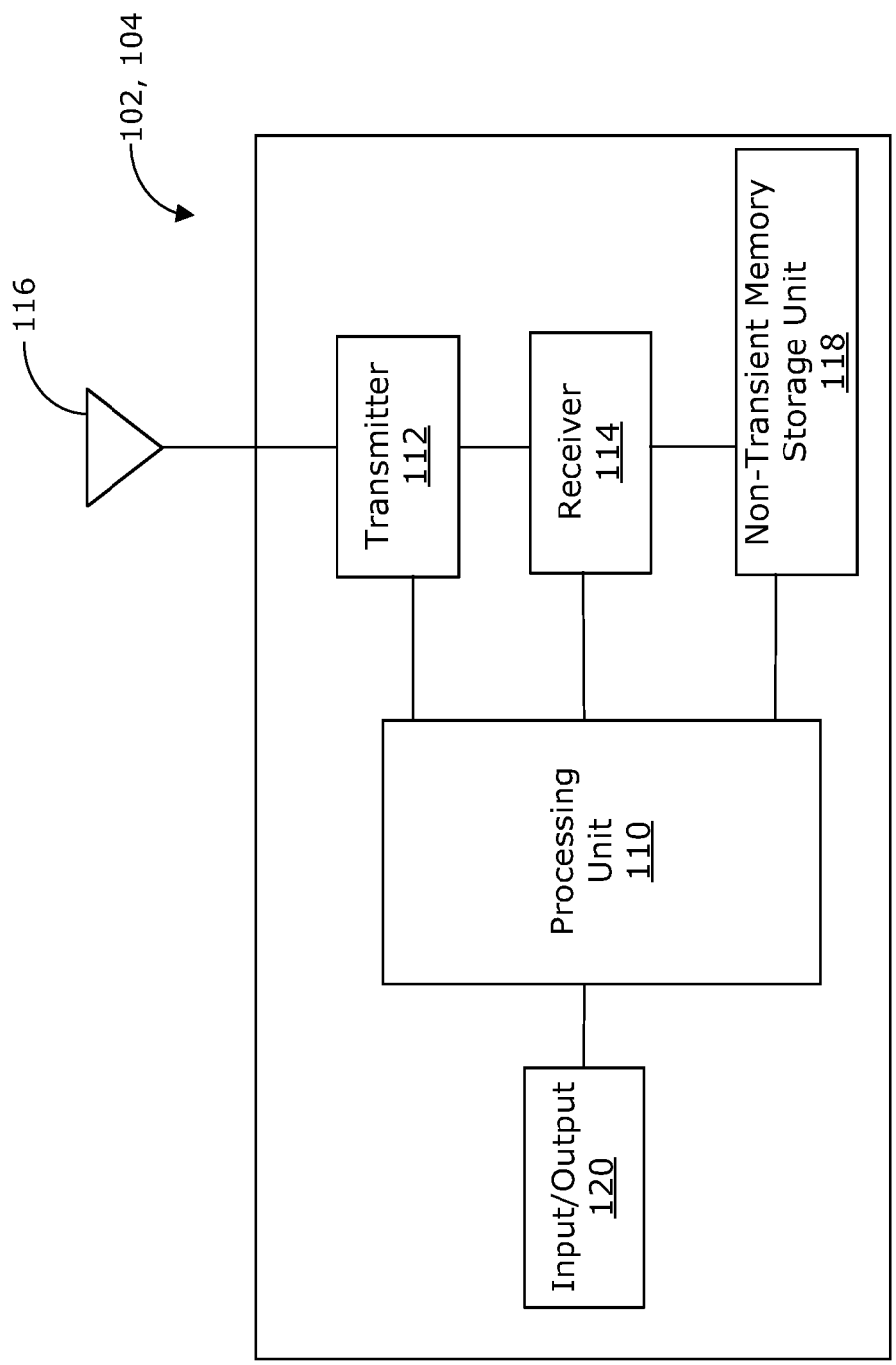
FIG. 2 is a block diagram illustrating an example processing system that can be used to implement a station in the communication network of FIG. 1 in accordance with one implementation of the present disclosure.

FIG. 2 shows an example wireless communication apparatus that may act as an AP 102 or a STA 104 shown in FIG. 1. The wireless communication apparatus includes at least one processing unit 110, at least one transmitter 112, at least one receiver 114, one or more antennas 116, at least one non-transitory memory storage unit 118, and one or more input/output (I/O) devices or interfaces 120.

The processing unit 110 implements various processing operations of AP 102 or the receiving STA 104, such as signal coding, data processing, power control, input/output processing, or any other functionality. The processing unit 110 can also be configured to implement some or all of the functionality and/or embodiments described herein. Each processing unit 110 includes any suitable processing or computing device configured to perform one or more operations. Each processing unit 110 can, for example, include a microprocessor, microcontroller, digital signal processor, field programmable gate array, or application specific integrated circuit. The processing unit 110 may be configured to generate wireless signals based on input data received through an input (via of I/O interfaces 120) for transmission by the transmitter 112, or to process wireless signals received from receiver 114. In example embodiments, the processing unit 110 may be configured to generate OFDM or orthogonal frequency division multiple access (OFDMA) signals that are suitable for transmission by, for example, performing an inverse fast Fourier transform (IFFT) or inverse discrete Fourier transform (IDFT) or any other suitable processing technique. The processing unit 110 may also be configured to process received OFDM signals or OFDMA signals by, for example, performing a Fast Fourier Transform (FFT) or discrete Fourier transform (DFT) or any other suitable processing technique. In some embodiments, the processing unit 110 may be configured to detect the presence of an OFDM signal or OFDMA signal by performing a correlation or cross-correlation, to detect a preamble. The preambles may be part of a predetermined frame structure for Wi-Fi communication. Although a single instance of a processing unit 110 is shown, it is to be understood that multiple instances of the processing unit 110 may be present in each wireless communication apparatus. For example, there may be at least one processing unit for processing output signals to be transmitted by the transmitter 112 and at least one processing unit for processing input signals from the receiver 114.

Transmitter 112 may include any suitable structure for generating signals for wireless or wired transmission. Each receiver 114 may include any suitable structure for processing signals received wirelessly or by wire. Each transmitter 112 and receiver 114 can include associated amplification and modulation/demodulation circuitry. Although shown as separate components, at least one transmitter 112 and at least one receiver 114 may be combined into a single transceiver. Each antenna 116 may include any suitable structure for transmitting and/or receiving wireless or wired signals. Although a common antenna 116 is shown here as being coupled to both the transmitter 112 and the receiver 114, one or more antennas 116 could be coupled to one or more transmitter(s) 112, and one or more separate antennas 116 could be coupled to one or more receiver(s) 114. In some examples, one or more antennas 116 may be an antenna array, which may be used for beamforming and beam steering operations. Each non-transitory memory storage unit 118 may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The non-transitory memory storage unit 118 may store instructions and data used, generated, or collected by AP 102 or STA 104. For example, the non-transitory memory storage unit 118 could store software instructions or modules configured to implement some or all of the functionality and/or embodiments described herein and that are executed by the processing unit(s) 110.

The I/O interfaces 120 may permit interaction with a user or other devices in the network. The I/O interfaces 120 includes any suitable structure(s) for providing information to or receiving/providing information from a user, including network interface communications.

In some embodiments, the AP 102 and STA 104 may be configured to communicate over various wireless spectra, for example, bandwidths of 20 MHZ, 40 MHz, or 80 MHZ, 80+80 MHZ, 160 MHZ, 160+160 MHZ, 320 MHZ, 320+320 MHz, 480 MHZ (such as 160+160+160 MHZ), and 640 MHz in the 2.4 GHZ, 5 GHZ and 6 GHz bands. According to some wireless standards, such as IEEE 802.11ax, an OFDMA channel is subdivided into multiple resource units (RUs), where each RU consists of a group of contiguous subcarriers defined in the frequency domain. In IEEE 802.11ax, RUs are defined based on RU sizes such as 26-tone RU, 52-tone RU, 106-tone RU, 242-tone RU, 484-tone RU, 996-tone RU and 2×996-tone RU. Although reference is made to IEEE 802.11ax, it is noted that techniques or mechanisms according to some implementations of the present disclosure can be used in conjunction with other standards, including future generations of IEEE 802.11 such as EHT standards or different standards.

In the wireless network 100, the wireless communication devices, such as AP 102 and STA 104, communicate with one another through various well-defined frame structures. The frame structures, such as a PPDU, may be generated by the processing unit 110 of the wireless communication apparatus shown in FIG. 2. In some embodiments, a frame structure may be configurable to have the same bandwidth as a channel. The frame structure may be in the form of a PPDU which may include a frame preamble portion, and a payload portion. In some embodiments, there may be different types of PPDUs that may have different fields and different PHY layers and/or different MAC layers. For example, a single user (SU) PPDU, multiple-user (MU) PPDU, LPI PPDU, long-range (LR) SU PPDU, trigger-based (TB) PPDU.

Figure 3:
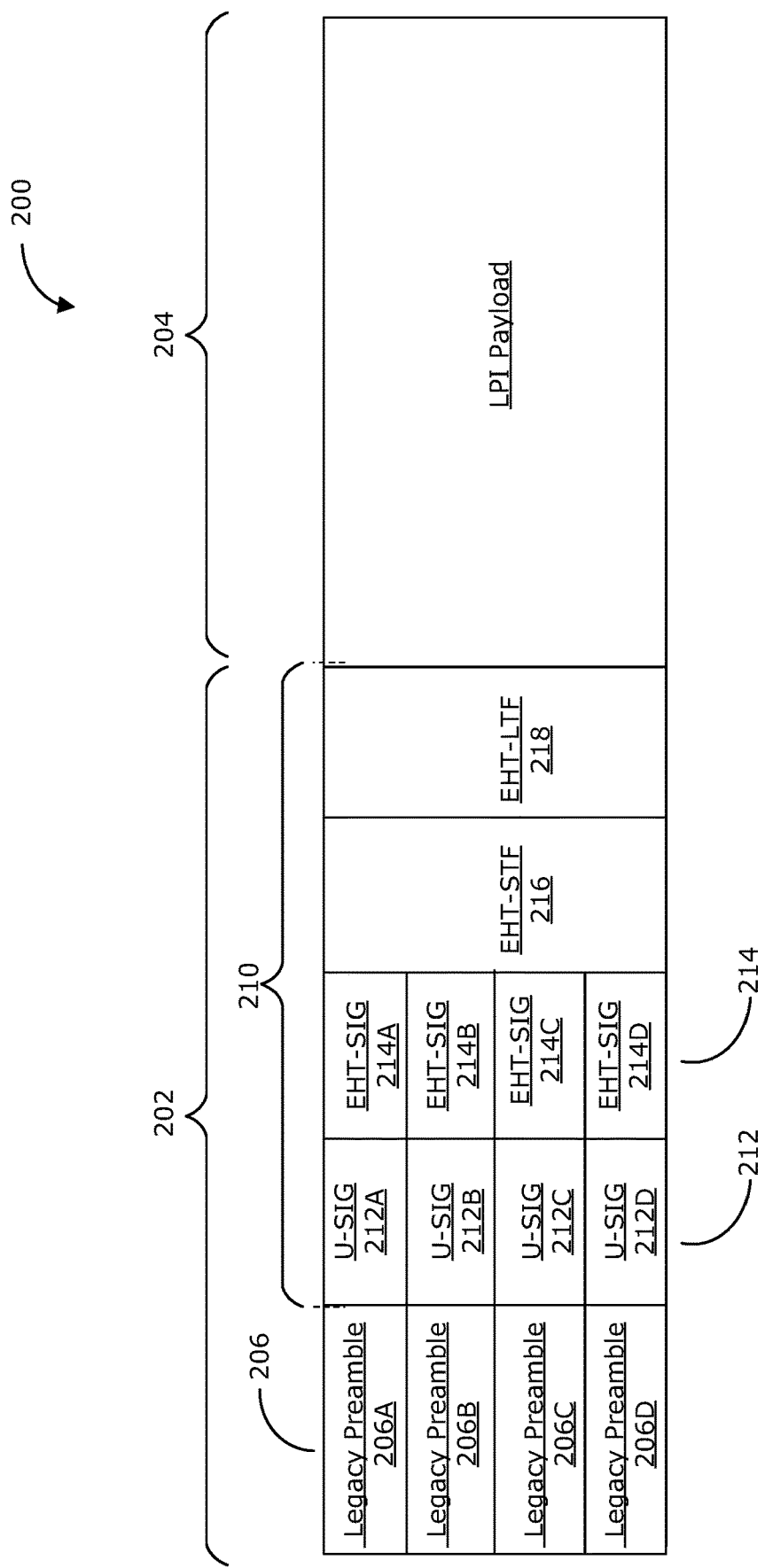
FIG. 3 shows an example of a data unit that can be used to carry information in a communication network.

For IEEE 802.11be, a wide BW LPI LR PPDU (the LPI long range PPDU) for operation in the 6 GHz band has been proposed to, at least in part, address the short range and decreased coverage area imposed on LPI devices by the proposed EIRP PSD requirements. For example, wide BW may be defined as having a BW equal to or greater than 80 MHz. FIG. 3 illustrates an example of a proposed EHT PPDU frame 200 that may be used for wide BW LPI LR communication in an 80 MHz channel. The EHT PPDU frame 200 may be generated and transmitted by a source station (e.g., an AP 102), and received and decoded by a destination station (e.g., a STA 104). The EHT PPDU frame 200 may include a preamble portion 202 followed by a payload portion 204.

As shown, the preamble portion 202 may include a legacy preamble portion 206 and an EHT preamble portion 210. The legacy preamble portion 206, which was first established in the IEEE 802.11a standard (referred to as the 11a standard hereinafter), may permit backward-compatibility and coexistence with legacy IEEE 802.11 devices. The legacy preamble portion 206 may include two ODFM symbols carrying a legacy short training field (L-STF) (not shown) and a legacy long training field (L-LTF) (not shown) configured for frame detection and receiver synchronization, respectively. The legacy preamble portion 206 may be decoded by legacy Wi-Fi devices. For 802.11 standards after IEEE 802.11n, the MCS and frame length indicated in L-SIG may be token placeholders. The real values of MCS, frame size, and other parameters may be transmitted by other symbols according to a particular version. By way of an example, in IEEE 11ax, the preamble 202 repeats L-SIG as RL-SIG and indicates the length equal to one or two modulo three. Second, the High Efficiency (HE) signal field contains two OFDM symbols. The first one is modulated with QBPSK, while the second one is modulated with either BPSK or QBPSK. The result of the modulo operation combined with BPSK/QBPSK selection identifies one of the four 11ax frame types.

In the illustrated embodiment, the EHT preamble portion 210 includes a universal signal field (U-SIG) 212, EHT-SIG field 214, EHT-STF field 216, and EHT-LTF field 218. In some embodiments, the frame formats of the 11be standard and beyond use a two-OFDM-symbol long universal SIG (U-SIG) 212, which may comprise of information bits regarding the payload portion 204. The adoption of the U-SIG 212 may provide forward compatibility with future IEEE 802.11 standards. As it may be appreciated, being two symbols long, the U-SIG 212 may possess a maximum bit carrying capacity of 42 bits. The U-SIG 212 is similar to the HE-SIG-A in the 11ax PPDU in that it may contain version-independent information followed by version dependent information. The version independent information may include a three-bit PHY format identifier, one-bit UL/DL flag, Basic Service Set (BSS) color of at least 6 bits, transmission (TX) opportunity (TXOP) duration of at least 7 bits, bandwidth etc. The version dependent information may include the number of EHT long training fields symbols, mid-amble periodicity, and space-time block coding flag among other information. The U-SIG 212 may be further encoded with separate error detection code (i.e. cyclic redundancy check (CRC) code of at least 4 bits) and 6 tail bits. Further, the presence of the U-SIG 204, together with other symbols, such as L-SIG, may allow the receiver to differentiate between an 11be frame and an 11ax frame. For example, for 11be EHT transmission, the L_LENGTH field in L-SIG may be set such that L_LENGTH modulo 3 is equal to 1 and the bit B0 of U-SIG 212 may be set to 0 which the receiver may recognize as an EHT PPDU. In some embodiments, the U-SIG 212 may be encoded with MCS0 at a code rate of R=1/2, interleaved, and mapped to a binary phase shift keying (BPSK) constellation.

In some example embodiments, the EHT-SIG field 214 may store information in addition to those stored in the U-SIG field 212. The EHT-SIG field 214 may adopt its own MCS that is different from the data MCS and can occupy a variable number of ODFM symbols, which may be indicated in the U-SIG field 212. In example embodiments, The EHT-SIG field 214 may include a common field and a user-specific field. The common field may contain information about MCS, the number of spatial streams (NSS), coding, the duration of the guard interval, and RU allocation, etc. The user-specific fields may be present for multi-user (MU) frames and carry dedicated information for individual STAs. For example, the EHT-SIG field 214 may include subfields for each of the multiple STAs. Each STA subfield can include subfields that specify: STA-ID that uniquely identifies the target STA, the RUs assigned to the target STA, and the MCSs used for each of the respective RUs assigned to the target STA (e.g., MCS (i) for RU i; MCS (j) for RU j). In example embodiments, the MCS subfields can be populated with an MCS index value that maps to the specified MCS applied to the RU.

In some example embodiments, the EHT short training field (STF) 216 and EHT long training field (LTF) 218 may follow the EHT-SIG field 214 and, may serve to define time and frequency tuning of MIMO/OFDMA. In some embodiments, EHT-STF 216 and EHT-LTF 218 are of the longer variants of STF and LTF from the 11ax standard, which may enable extended range and better channel estimation. In some of the wide BW embodiments having channel BW of 80 MHz or greater, the EHT-STF field 216 and the EHT-LTF field 218 are repeated every 20 MHz as shown in FIG. 2. In some embodiments, the phase of every 20 MHz copy of the EHT-STF 216 and EHT-LTF 218 may be rotated to reduce the peak-to-average power ratio and enhance correlation performance.

In some example embodiments, when a wide bandwidth is used, the legacy preamble portion 206, the U-SIG field 212, and the EHT-SIG field 214 may be duplicated every 20 MHz. Thus, as shown, in an 80 MHz channel, the legacy preamble 206 is repeated four times into legacy preambles 206A, 206B, 206C, and 206D; U-SIG fields 212A, 212B, 212C, and 212D; as well as EHT-SIG fields 214A, 214B, 214C, and 214D.

The payload portion 204 may include one or more fields in the form of OFDM symbols containing Physical Layer Convergence Protocol (PLCP) Service Data Units (PSDU), which is the data unit sent down from the MAC layer for transmission on the wireless medium 106.

Dual carrier modulation (DCM) is a technique adopted in 802.11ax [802.11axD6.0] to improve the link budget. DCM modulates the same information on a pair of subcarriers. DCM is considered in 802.11ax to improve link error rate performance by using frequency domain diversity gain, with a reduction of spectrum efficiency and data rate by half. In 802.11 amendments using OFDM, the subcarrier spacing is defined to be fixed as 312.5 kHz. Therefore, the duration of each OFDM symbol with a given cyclic prefix duration is also fixed. For example, if the duration of cyclic prefix is 0.8 µs, the duration of an OFDM symbol in WLAN is 4 µs. Accordingly, a further constraint on solutions to improve signal power and range (e.g., link budget) is the defined OFDM symbol length of the system in which they operate.

In an effort to improve link budget, a frequency domain DUP mode has been proposed to maximize the usage of bandwidth (BW) to increase the transmission range and power in LPI WiFi. DUP mode in frequency domain (DUP-F) duplicates the DCM signal tones in frequency domain by using a doubled PPDU BW compared to the DCM signal defined in IEEE 802.11ax. In the proposed LPI EHT DUP-F mode, each OFDM symbol carries four copies of one half of a data segment s(i), with two OFDM symbols required for an entire data segment. Thus, for a given PPDU BW, DUP-F mode requires two IFFT procedures to generate two respective OFDM symbols to transmit a data segment s(i) whereas in IEEE 802.11ax DCM, only one IFFT (and one OFDM symbol) is required to transmit a data segment s(i) of the same size. Similarly, a DUP-F mode receiver, requires two FFT procedures to detect the whole data segment s(i). The benefit of DUP-F mode, compared to DCM with the same BW, is the SNR value of each data tone can be doubled to improve the link performance and link budget.

Although DUP-F mode may enhance strength and range, it requires a change in frequency domain processing by a source station and a destination station relative to the processing done in the context IEEE 802.11ax DCM transmissions. Such a change may not be desirable. Accordingly, a first example embodiment will now be described that enables a time-domain duplication mode, referred to hereafter as DUP-T mode. As will now be described, in DUP-T mode, an OFDM symbol is duplicated one or multiple times in time domain to increase the link budget.

Figure 4:
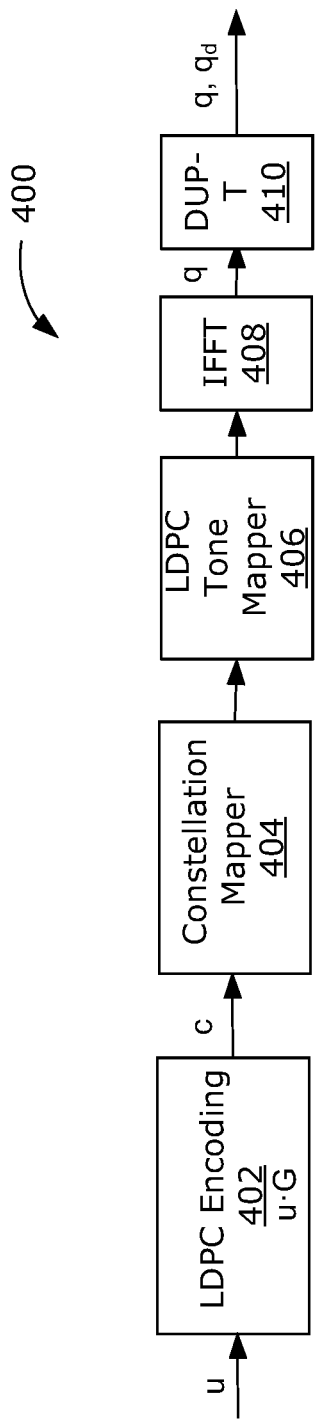
FIG. 4 is an example of an OFDM symbol generator that can be used in a source station of the communication network, according to example embodiments.
Figure 5:
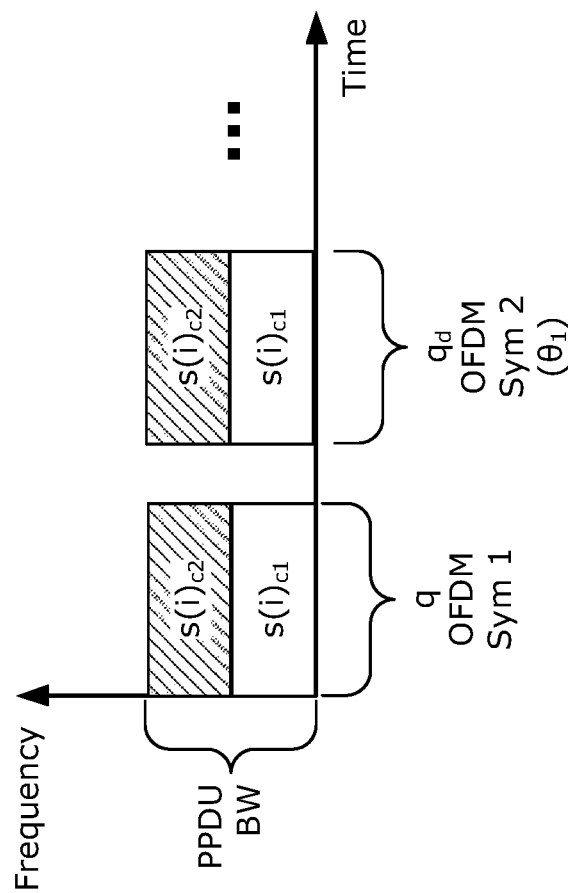
FIG. 5 is a frequency-time plot showing an example of OFDM symbols generated by the OFDM symbol generator of FIG. 4.

In this regard, FIG. 4 illustrates a logical block diagram of an OFDM symbol generator 400 that can implemented by a processing unit 110 of a source station (e.g., AP 102 or STA 104), according to example embodiments, to support a DUP-T mode, and FIG. 5 illustrates OFDM symbols generated by generator 400 in frequency and time domain. In the example of FIG. 4, generator 400 includes a low density parity check (LDPC) encoder 402 that receives an input source word u of information bits and outputs a respective codeword c. source word u may be considered as a 1×k row vector or a one-dimensional binary 1×k matrix u=[$u_1$, ..., $u_k$]. The k-bit source u is encoded by LDPC encoding 402 to a respective n-bit codeword c=[$c_1$, ..., $c_n$] by multiplying the source word u with a generator matrix G (e.g. c=u·G). The n-bit codeword c includes k information bits (corresponding to the k-bits of source word u) and n-k parity check bits. In example embodiments, known procedures for generating LDPC codewords from source words using generator matrix G can be applied to perform LDPC encoding 402. As known in the art, generator matrix G corresponds to a parity check matrix H, and each codeword c satisfies the equation: H·c=0.

The codeword c is then subjected to DCM modulation, which in example embodiments apply the same DCM modulation techniques used for 802.11ax compliant DCM modulation. In this regard, a constellation mapper 404 is used to modulate a data segment s(i), representing a set of encoded bits from the codeword c, to a first set of modulated symbols (e.g., QPSK, or N-QAM, or other constellation symbol scheme). In the case of DCM modulation, constellation mapper 404 modulates the same bit information from data segment s(i) onto two separate subcarriers, such that each of the two subcarriers carry the same bit information. In some examples, a different constellation mapping may be used for each of the subcarriers. For example, the constellation mapping for one subcarrier may be phase-rotated relative to the other subcarrier. The first set of modulated symbols are then mapped onto a first set of frequency subcarriers of an OFDM symbol, and the second set of modulated symbols are mapped onto a second set the frequency subcarriers of an OFDM symbol using LDPC tone mapping that is applied by LDPC tone mapper 406.

Accordingly, LDPC tone mapper 406 outputs a DCM signal that comprises two data segments, $s(i)_{c1}$ and $s(i)_{c2}$, each of which occupy a respective frequency segment of OFDM subcarriers, with each data segment $s(i)_{c1}$ and $s(i)_{c2}$ carrying the same bit information (e.g., data segment s(i)). The frequency domain DCM signal (comprising data segments $s_{c1}$ and $s_{c2}$) is subjected to an inverse fast Fourier transform (IFFT) operation 408 (which may by implemented using an inverse discrete Fourier transform (IDFT) in example embodiments) to generate a time domain OFDM symbol q that includes data segments $s_{c1}$ and $s_{c2}$. In an example embodiments, a time domain duplication (DUP-T) operation 410 is then applied that duplicates OFDM symbol q and applies a linear phase rotation θ, resulting in a time-adjacent, duplicate OFDM symbol $q_d$ that carries the same bit information as OFDM symbol q. The two OFDM symbols q and $q_d$ form part of a packet, for example part of the LPI payload 204 of a PPDU 200, that is modulated onto a carrier frequency and transmitted to a destination station through wireless medium 106.

As indicated in FIG. 5, the two OFDM symbols q and $q_d$ each include data segments $s(i)_{c1}$ and $s(i)_{c2}$. In the illustrated embodiment, a first frequency segment of subcarriers that corresponds to a lower half of the PPDU BW carries the data segment $s_{c1}$ and a second frequency segment of subcarriers that corresponds to an upper half of the PPDU BW carries the data segment $s(i)_{c2}$. The data segments $s(i)_{c1}$ and $s(i)_{c2}$ each carry the same bit information from codeword c. Accordingly, the receiving STA will receive four copies of the same bit information over the course of the two OFDM symbols q and $q_d$. Thus, the DUP-T mode illustrated in FIGS. 4 and 5 uses DCM signals in two adjacent OFDM symbols to carry the same data segment s(i) while 802.11ax DCM uses only one OFDM symbol with the same PPDU BW. The data rate of DUP-T mode of FIGS. 4 and 5 is the same as that of the proposed LPI EHT DUP-F mode described above, which is one half of data rate of 802.11ax DCM given the same bandwidth.

Although the DUP-T mode with DCM embodiment illustrated in FIGS. 4 and 5 shows only a single duplicate OFDM symbol, in further example embodiments, more than one linear phase shifted duplicate of OFDM symbol q can be generated. This, in DUP-T mode with DCM, an OFDM symbol q carrying data with DCM modulated signals (e.g., $s_{c1}$ and $s_{c2}$) in frequency domain is duplicated one or multiple times. The kth duplicated OFDM symbol in the time domain can be applied to a linear phase rotation $θ_k$ ($θ_k∈[0, 2π)$, k=1, 2, ...), implying that the subcarriers of the OFDM symbol in frequency domain are right-cyclic-shifted n=θk/2π×M positions, where M is the total number of subcarriers in the OFDM symbol.

In the DUP-T mode with DCM embodiment illustrated in FIGS. 4 and 5, it will be appreciated the multiple OFDM symbols q and $q_d$ are generated at DUP-T operation 410 by duplicating the samples in the first OFDM symbol q with an appropriate linear phase rotation θ, post IFFT, in the time domain. Accordingly, only a single IFFT operation 408 is required to encode a data segment s(i), as opposed to the above-described LPI EHT DUP-F mode, which requires two IFFT operations 408. A station receiving the multiple OFDM symbols $q^T$, $q_d^T$ generated according to the DUP-T mode embodiment illustrated in FIGS. 4 and 5 can combine the corresponding duplicated OFDM symbols before an FFT operation is performed at the receiver. Therefore, in example embodiments, only a single FFT operation is required for detection of each data segment s(i). The linear phase rotation $θ_k$ applied to each duplicated OFDM symbol can potentially provide diversity in the frequency domain when the receiver combines a received OFDM symbol $q^T$ and its one or more corresponding duplicated OFDM symbols $q_{d(1)}^T$ to $q_{d(k)}^T$.

In some example embodiments, rather than using a phase rotated constellation modulation for data segment $s(i)_{c2}$ relative to data segment $s(i)_{c1}$, in some examples embodiments the data segment s(i) is simply copied to both sets of DCM subcarriers without any relative phase rotation or change in modulation scheme. For example, half of the PPDU BW is occupied with the exact duplicated information as the other half of the PPDU BW. This can be extended to repeating the other half of the PPDU BW to any PPDU BW frame such as 80, 160, or 320 MHz.

Figure 6:
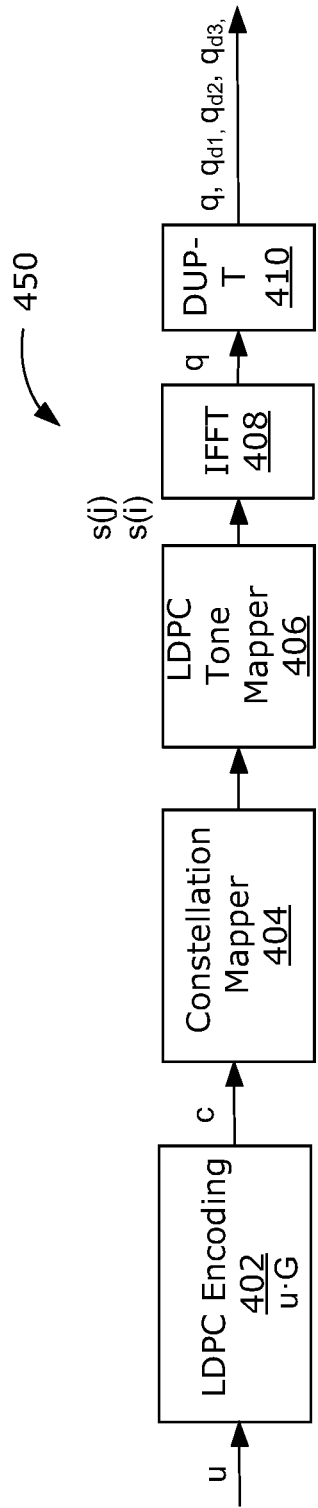
FIG. 6 is an example of an OFDM symbol generator that can be used in a source station of the communication network, according to further example embodiments.
Figure 7:
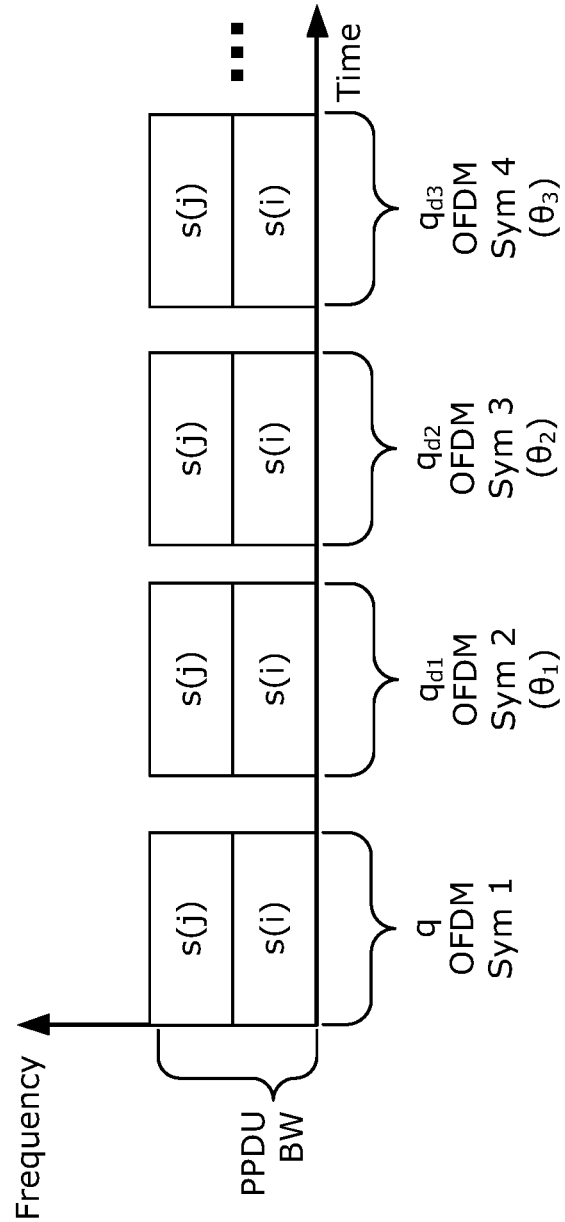
FIG. 7 is a frequency-time plot showing an example of OFDM symbols generated by the OFDM symbol generator of FIG. 6.

In a further example embodiment, the time domain OFDM symbol duplication can be performed without DCM. FIGS. 6 and 7 illustrate a further example embodiment of a DUP-T mode that does not use DCM. FIG. 6 shows an example of an OFDM symbol generator 450 that is similar to the OFDM symbol generator 400 of FIG. 4 except that the constellation mapper 404 and LDPC tone mapper 406 of OFDM symbol generator 450 does not apply DCM when modulating codeword c bit information to modulated symbols. Accordingly, as the same bit information is not duplicated in frequency domain, the set of available subcarriers can be used to carry twice amount of bit information as when DCM is used. For example, half of the subcarriers can be used to carry the bit information corresponding to a first data segment s(i) and the other half of the subcarriers can be used to carry the bit information corresponding to different data segment s(j). Each OFDM symbol q carries bit information for two data segments s(i) and s(j).

FIGS. 6 and 7 illustrate an example in which DUP-T operation 410 duplicates OFDM symbol q three times, with respective linear phase rotations $\theta_1$, $\theta_2$ and $\theta_3$. The first OFDM symbol q and its linear phase rotated duplicate OFDM symbols $q_{d1}$, $q_{d2}$, $q_{d3}$ each carry the same data segments s(i) and s(j). It will be appreciated that data segments s(i) and s(j) can be considered as a single data segment that is twice the size of the data segment that is used in a DCM system.

Thus, compared to the DUP-T mode with DCM of FIGS. 4 and 5, in which the PPDU BW of an OFDM symbol includes two copies of the same data segment, in the case of OFDM symbol generator 450, the same PPDU BW can be used for twice the amount of bit information (e.g., data segments s(i) and s(j)).

DUP-T without DCM, yields the same data rate and SNR for time-domain samples as DUP-T with DCM (e.g., four OFDM symbols can be used to transmit four copies of two data segments s(i) and s(j) in total). Implementation for DUP-T without DCM may be simplified relative to DUP-T with DCM as it reduces IFFT and FFT operations in a source station and a destination station respectively. For example, to transmit two data segments s(i) and s(j), only one IFFT is required in DUP-T without DCM, whereas two IFFT operations are required in DUP-T with DCM and four IFFT operations are required in the above described LPI EHT DUP-F.

For a given PPDU BW, the DUP-T and DUP-F modes as described above have the same maximum transmit power, implying that both modes have the same transmission range under the same channel conditions. In DUP-T, the link budget is improved with repetition of OFDM symbols delivering the same data information, resulting in lower spectrum efficiency and data rate compared to the case without OFDM duplication in time domain.

The simplest PPDU frame for DUP-T-mode with or without DCM can be a 20 MHz Bandwidth wide PPDU. However, the data rate for 20 MHz DUP-T mode without DCM (e.g., FIG. 7) is twice as high as the 20 MHz DUP-T with DCM in frequency as seen in FIG. 5 (e.g., each OFDM symbol can carry two different data segments as opposed to two copies of one data segment).

Figure 8:
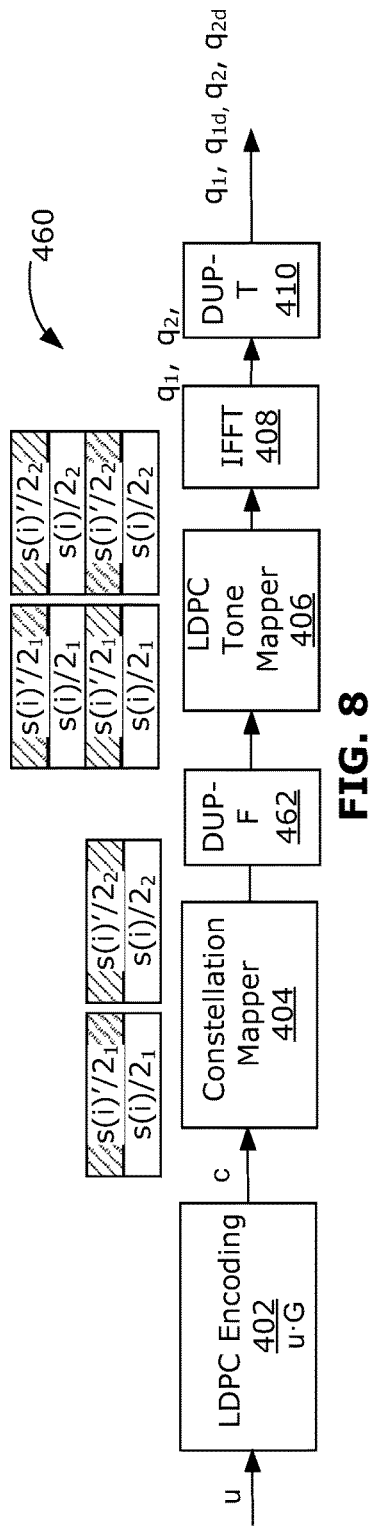
FIG. 8 is an example of an OFDM symbol generator that can be used in a source station of the communication network, according to a further example embodiment.
Figure 9:
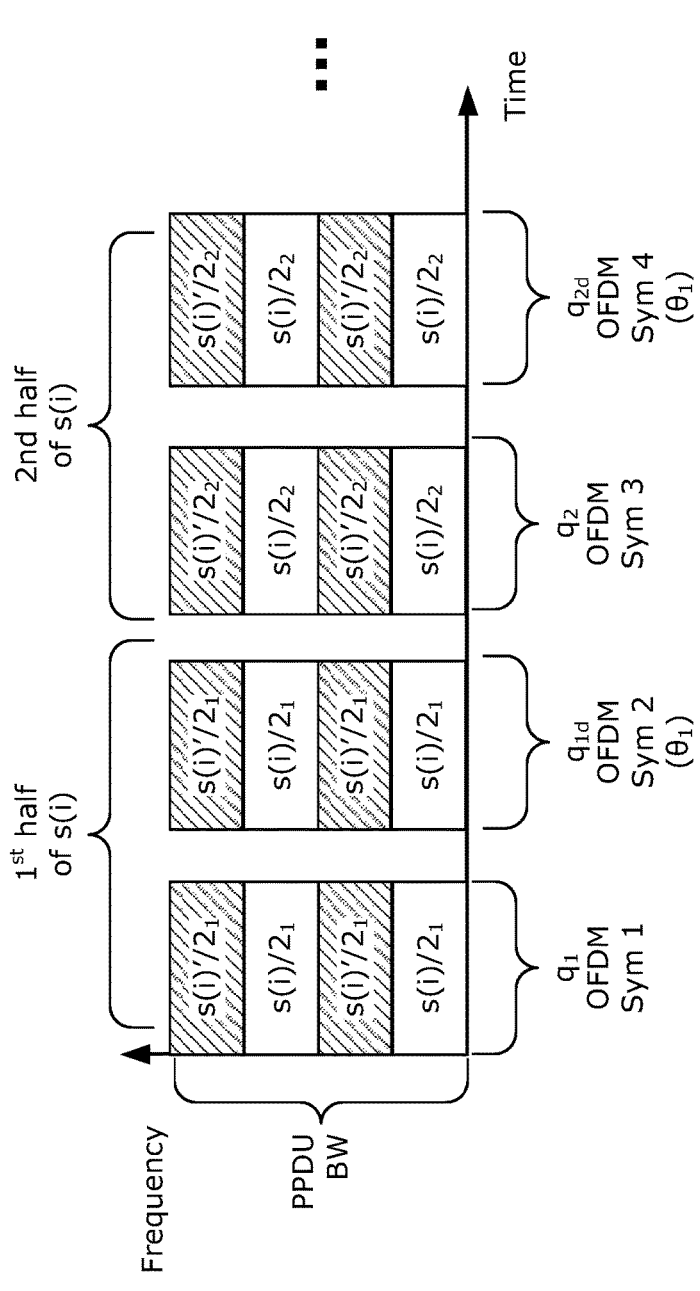
FIG. 9 is a frequency-time plot showing an example of OFDM symbols generated by the OFDM symbol generator of FIG. 8.

In a further example embodiment, features of the above described LPI DUP-F mode and DUP-T mode can be combined, referred to in this disclosure as DUP-F+DUP-T mode. In this regard, FIG. 8 illustrates an example of an OFDM symbol generator 460. In the symbol generator 460, a data segment s(i) is divided into a first half segment $s(i)/2_1$ and a second half segment $s(i)/2_2$. Constellation mapper 404 applies DCM to map the first half data segment $s(i)/2_1$ to a first set of modulated subcarrier symbols, and a phase-rotated copy of the first half data segment, $s(i)'/2_1$, to a second set of modulated subcarrier symbols. The first and second sets of modulated symbols correspond respectively to first and second sets of subcarriers that collectively correspond to half of the PPDU BW of a first OFDM symbol $q_1$. Constellation mapper 404 applies DCM to map the second half data segment $s(i)/2_2$ to a first set of modulated subcarrier symbols, and a phase-rotated copy of the second half data segment, $s(i)'/2_2$, to a second set of modulated subcarrier symbols that collectively correspond to half of the PPDU BW of a further OFDM symbol $q_2$.

At a frequency duplication operation DUP-F 462, the modulated set of subcarriers that carry first half data segment $s(i)/2_1$ and its DCM copy $s(i)'/2_1$ are collectively copied, resulting in a set of subcarriers that correspond to the PPDU BW of first OFDM symbol $q_1$, and that includes four copies of the same bit information, namely two copies of $s(i)'/2_1$ and two copies of $s(i)/2_1$. The set of subcarriers is mapped onto data carriers corresponding to first OFDM symbol $q_1$ using LDPC tone mapping that is applied by LDPC tone mapper 406. Similarly, a further OFDM symbol $q_2$ is generated that includes four copies of the bit information of the second half of data segment, namely two copies of $s(i)'/2_2$ and two copes of $s(i)/2_2$.

The subcarriers corresponding to the two OFDM symbols $q_1$, $q_2$ are respectively subjected to IFFT operation 408, resulting in OFDM symbol $q_1$ (which carries four copies of the same bit information, corresponding to the first half of the data segment s(i), and OFDM symbol $q_2$ (which carries four copies of the same bit information, corresponding to the second half of the data segment s(i)). In an example embodiments, a time domain duplication (DUP-T) operation 410 is then applied that duplicates OFDM symbol $q_1$ and applies a linear phase rotation θ1, resulting in a time-adjacent, duplicate OFDM symbol $q_{1d}$, and that also duplicates OFDM symbol $q_2$ and applies the linear phase rotation θ1, resulting in a time-adjacent, duplicate OFDM symbol $q_{2d}$.

The DUP-F+DUP-T mode may, in some applications, further improve link budget with a reduction of data rates.

For illustrative purposes, Tables 1 and 2 represent the lowest data rates of the different transmission options described above for different transmit BWs.

TABLE 1

Data rates of DUP-T with DCM, DUP-F, and DUP-F + DUP-T

| Tx BW (MHz) | Lowest data rate (Mbps) with 0.8 us GI and DCM in LPI | | | Lowest data rate (Mbps) with 0.8 us GI and DCM in 11ax [802.11axD6.0] |
|---|---|---|---|---|
| | DUP-T | DUP-F | DUP-F + DUP-T | |
| 20 | | | | 4.3 |
| 40 | 4.3 | 4.3 | 2.15 | 8.6 |
| 80 | 9 | 8.6 | 4.3 | 18 |
| 160 | 18 | 18 | 9 | 36 |
| 320 | 36 | 36 | 18 | |

TABLE 2

Data rates for DUP-T without DCM, and DUP-F

| Tx BW (MHz) | Lowest data rate (Mbps) with 0.8 us GI in LPI | | Lowest data rate (Mbps) with 0.8 us GI in 11ax [802.11axD6.0] | Lowest data rate (Mbps) with 0.8 us GI and DCM in 11ax [802.11axD6.0] |
|---|---|---|---|---|
| | DUP-T without DCM | DUP-F | | |
| 20 | | | 8.6 | 4.3 |
| 40 | 4.3 | 4.3 | 18 | 8.6 |
| 80 | 9 | 8.6 | 36 | 18 |
| 160 | 18 | 18 | 72.1 | 36 |
| 320 | 36 | 36 | | |

As noted above in DUP-T mode, the number of duplicated OFDM symbols can be more than one, which can provide a flexible tradeoff between link budget and data rate.

When PPDU BW is larger than 80 MHZ, DUP-F mode preamble detection is limited within one 80 MHz channel given that an 802.11be compliant STA will can be scheduled to park only on an 80 MHz channel. In the case of for DUP-T mode that uses one duplication of an OFDM symbol, preamble detection can be achieved by combining the preamble transmitted over one 80 MHz channel in two different OFDM symbols. As a result, DUP-T mode may yield more robust preamble detection than DUP-F mode.

In the example embodiments described above, the data segments s(i) are duplicated in frequency domain or time domain, subsequent to LDPC encoding. In an alternative example embodiment, the same information bits corresponding to a source word u are subjected to multiple LDPC encodings that are then included in the same PPDU. In such embodiments, the multiple LDPC encodings may be done in a manner similar to that is performed in the context of hybrid automatic repeat request (HARQ) retransmissions, with the exception that the differently encoded data is included in the same PPDU rather than in retransmission PPDUs.

In order to provide context, and introduce a set of permuted extension (PE) LDPC code families, a description of different LDPC encoding will be described in the context of incremental redundancy hybrid automatic repeat request (IR-HARQ) that is not limited to LPI applications. Communications between STAs, including for example between a STA 104 and the AP 102, in the network 100 is implemented by encoding source words using LDPC encoding techniques to generate codewords. The codewords resulting from LDPC encoding of respective source words are embedded in packets or frames (e.g., PPDUs) that are modulated and transmitted over wireless medium 106 between AP 102 and STA 104.

Figure 10A:
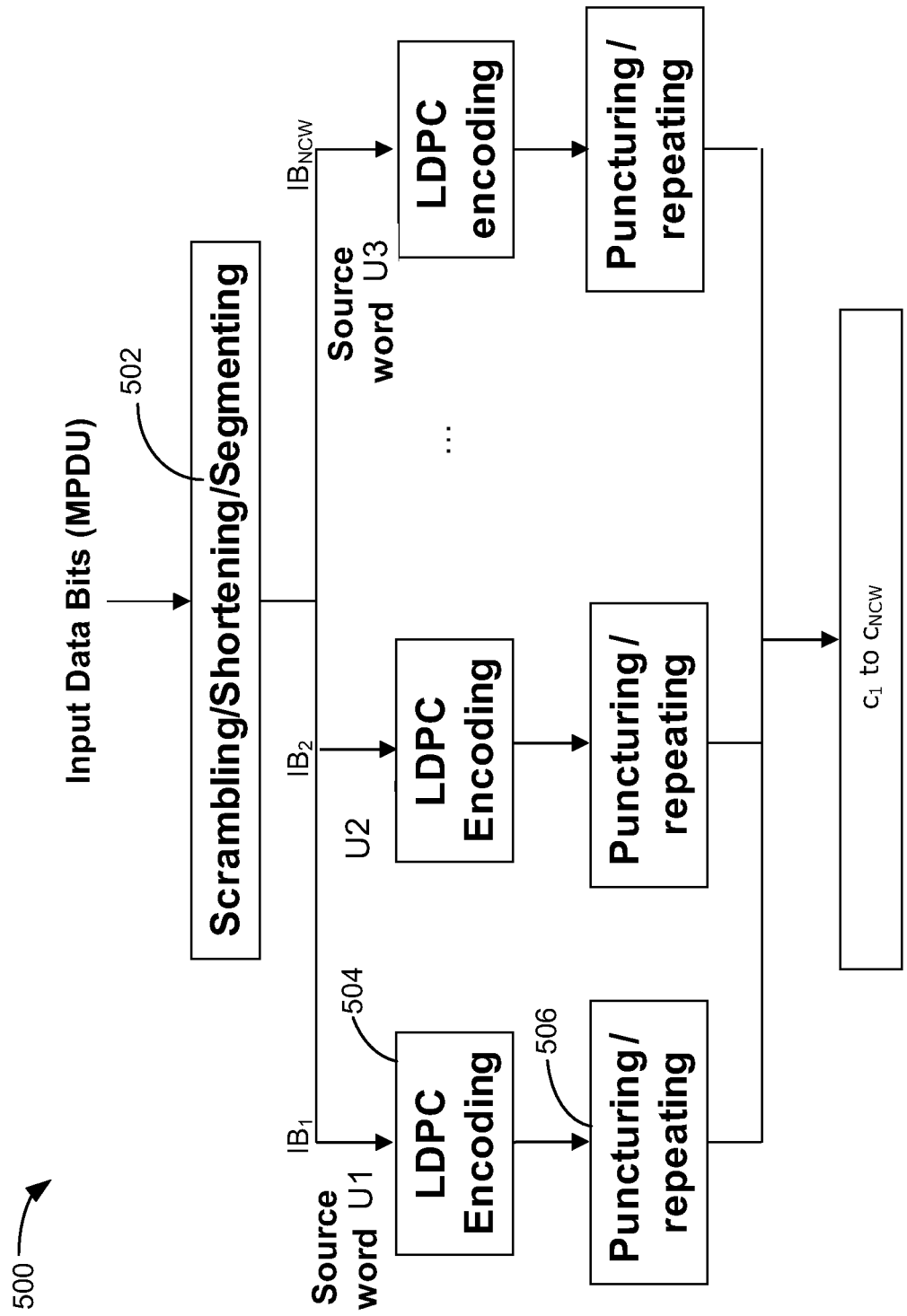
FIG. 10A is a block diagram illustrating an encoding procedure according to example embodiments.

Encoding can be performed at an AP 102, for generating a set of NCW codewords $c_1$ to $c_{NCW}$ for inclusion in a PPDU 300. FIG. 10A illustrates an example of an encoding procedure 500. In example embodiments, encoding procedure 500 can be the same as known procedures used to generate LDPC codewords for a PPDU that is compliant with IEEE std 802.11REVmdD4.0. In this regard, data bits (e.g. the bits that make up PPDU payload) are subjected to scrambling, shortening and segmenting operations 502, resulting in a set of information blocks $IB_1$ to $IB_{NCW}$ that are each k-bits in length. The information blocks $IB_1$ to $IB_{NCW}$ are used as respective k-bit source words $u_1$ to $u_{N_{cw}}$ that are each subjected to a respective LDPC encoding operation 504, resulting in respective n-bit codewords $c_1$ to $C_{NCW}$. In some embodiments, codewords may be subjected to respective puncturing and repeating operations 506. In the portion of the present description that relates to IR-HARQ, the subscript "j" is used to denote a generic information block $IB_j$, source word $s_j$, and codeword $c_j$ where 1≤j≤NCW.

In example embodiments, the LDPC encoding applied in example embodiments uses LDPC codes that are specified in one or more of the IEEE 802.11 protocols, including for example the code rates, codeword block sizes, and parity check matrices specified in IEEE std 802.11REVmdD4.0.

IEEE std 802.11REVmdD4.0 specifies coding parameters for a number of LDPC codes. A unique parity check matrix (PCM) H is defined for each particular combination of coding rate R and LDPC codeword length N. More particularly, a base PCM Hb is defined for each combination of coding rate R and LDPC codeword length N. The corresponding PCM H is obtained by lifting the base PCM Hb by a lifting factor Z, such that every matrix element in base PCM Hb is replaced with a respective circulant submatrix Pi of size Z×Z. These circulant submatrices are either cyclic permutations of a Z×Z identity matrix or a Z×Z null matrix. Each submatrix element in the base PCM Hb is populated either with a value w (0≤w≤Z) that specifies respective circulant submatrix Pw, or with a null indicator that indicates a null matrix. The value "w" indicates a number of cyclic right shifts that are applied to the Z×Z identity matrix to arrive at submatrix Pw.

Figure 10B:
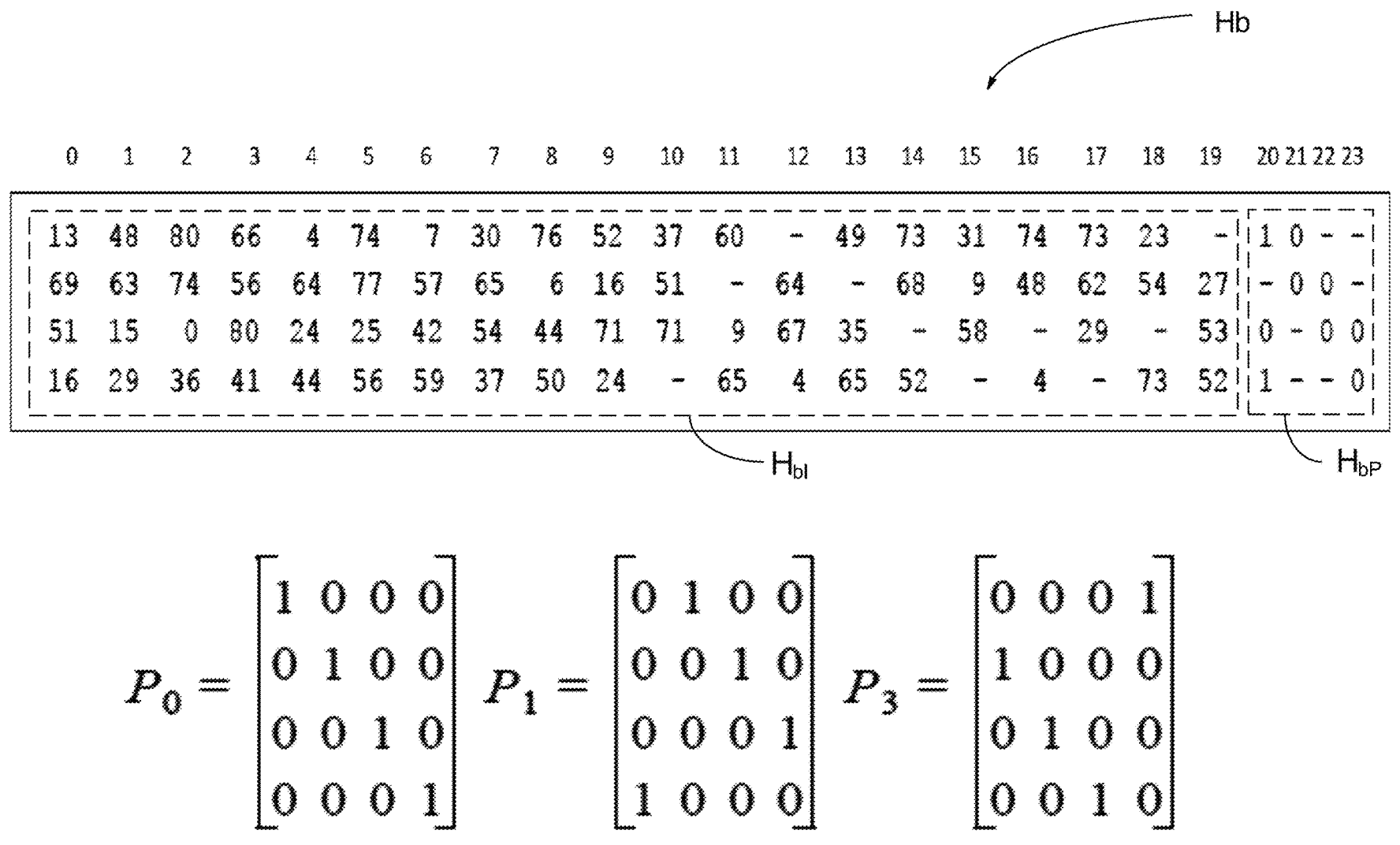

For illustrative purposes, FIG. 10B illustrates the base PCM Hb (4×24) for coding rate 5/6 LDPC code with n=1944 and Z=81. Base PCM Hb can generate a PCM H of size (4*81) rows×(24*81) columns. Each of the array elements in Base PCM Hb indicates either a number w of cyclic right shifts to apply to a 81×81 identity matrix (e.g., element (0,0) specifies 13 cyclic right shifts), or a null matrix (e.g., element (0,12) specifies "–", indicating an 81×81 matrix of zeros). The base PCM Hb includes two parts, namely an information part $H_{b1}$, which has a size of ((nb–kb)×kb)) and a parity part $H_{bP}$, which has a size of ((nb–kb)×(nb–kb)), where kb=k/Z and nb=n/Z). As noted above, k is the size of source word u, and n is the size of codeword c.

FIG. 10B also illustrates an identity matrix $P_0$ for the simplified case where Z=4, as well its first cyclic right shift version ($P_1$) and third cyclic version ($P_3$), respectively illustrating examples of w=0, 1 and 3 for Z=4.

Codewords $c_1$ to $c_{NCW}$ may each be subjected to respective puncturing and repeating operations, and combined into a bitstream for inclusion in a PPDU. The codewords $c_1$ to $c_{NCW}$ in a PPDU are modulated onto an RF signal and transmitted to destination STA 104.

A destination STA 104 is configured to receive a signal modulated with the PPDU transmitted by source AP 102 and decode the received codewords $c_1^T$ to $C_{NCW}^T$ embedded in the PPDU 300 (superscript "T" denotes a codeword received at the destination STA 104 after passing through a channel of wireless medium 106). In example embodiments, the received signal is equalized to reduce intersymbol interference caused by the RF channel, and demodulated to generate an initial set of soft channel bit values for each of the codewords $c_1^T$ to $c_{NCW}^T$. A decoder decodes LDPC codewords $c_1^T$ to $c_{NCW}^T$. As known in the art, decoding is performed based on the parity check matrix (PCM) H and Tanner graph corresponding to the generator matrix G applied at the transmitting source to generate LPDC codewords $c_1$ to $C_{NCW}$. In this regard, decoding uses a log-likelihood ratio (LLR) calculator that is configured to calculate LLR values for each of the soft channel bits of a codeword $C_q^T$, which are initially assigned to the corresponding variable nodes of the Tanner graph during the decoding. An LDPC decoder then applies an iterative message passing algorithm (MPA) based on the log-likelihood ratio (LLR) values to either successfully decode the codeword $C_q^T$ and recover the source word $s_j$, or determine that the codeword $C_q^T$ cannot be successfully decoded. As known in the art, a received codeword $C_q^T$ is determined to be valid (e.g. successfully decoded) if the codeword $C_q^T$, after decoding, can satisfy $H \cdot b_j^T = 0$. In example embodiments, a decoding status is provided for each of the codewords $c_1^T$ to $c_{NCW}^T$ in the received PPDU, based on the validity of each codeword after decoding. In particular, the decoding status for each codeword $c_1^T$ to $c_{NCW}^T$ can be either: (a) successfully decoded or (b) unsuccessfully decoded.

The destination STA 104 is configured to generate and send a feedback message to the source AP 102. The source AP 102 is configured to identify, based on CW bitmap(s) included in the feedback message which codewords (if any) were unsuccessfully decoded at the destination STA 104 and then retransmit information about the unsuccessfully decoded codewords (or versions of the incorrectly codewords) in a new PPDU 300.

In at least some example embodiments, the retransmission procedures performed by the source AP 102 to retransmit unsuccessfully decoded codewords and the subsequent decoding procedures performed at destination STA 104 are configured to increase the chance of success based on information known from the failed transmission. In example embodiments the retransmission procedures performed by the source AP 102 to retransmit unsuccessfully decoded codewords rely on IR-HARQ. In particular, IR-HARQ codes are proposed that build on existing LPDC codes, thereby enabling backwards compatibility.

A retransmission procedure carried out by AP 102 will now be described in respect of a failed codeword $c^T_q$, with reference to FIG. 11. Failed codeword $c^T_q$ corresponds to a sourceword $S_q$. In the initial transmission, the sourceword $S_q$ that is LDPC encoded is identical to the information block $IB_j$ that results from set f rescrambling, and segmenting operations. As will be described below, for each successive retransmission AP 102 is configured to perform an encoding process 802(*i*) (where $1 \le i \le R_{max}$, and $R_{max}$ denotes a maximum number of retransmissions). Encoding process 802(*i*) includes a permutation operation 804 and an LDPC encoding operation 504. Permutation operation 804 is performed on the information block $IB_q$ that corresponds to failed codeword $c^T_q$ to generate a permuted sourceword $S_{q(i)}$ that is an interleaved version of the original sourceword $S_{q(i)}$. The interleaving is done according to a defined permutation map n. The a permuted sourceword $S_{q(i)}$ is LDPC encoded according generator matrix G of LDPC encoding operation to generate a respective permuted extension codeword c'q(i). Each encoding process 802(*i*) ($1 \le i \le R_{max}$) retransmission corresponds to a further extension being added to the initially transmitted LDPC codeword $C_{q(0)}$, and accordingly i also denotes the number of times an LDPC code has been extended.

Figure 11:
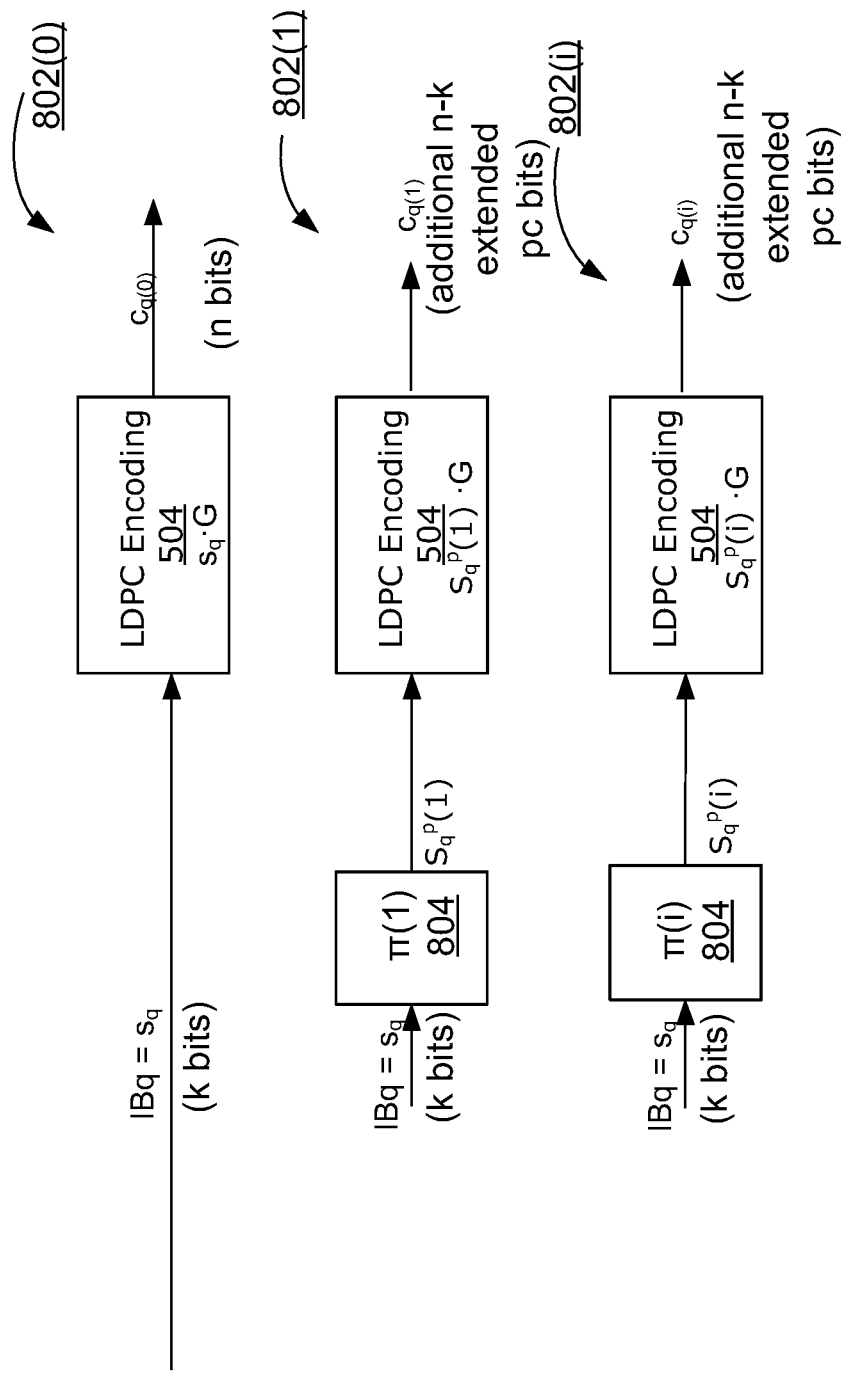
FIG. 11 is a block diagram illustrating a plurality of LDPC encoding processes according to example embodiments.

In FIG. 11, encoding process 802(0) corresponds to the LDPC encoding operation 504 performed on original length k information block $IB_q$ (i.e., sourceword $S_q$) to generate length n codeword $C_q$ during for the initial transmission (i=0). Encoding processes 802(1) and 802(*i*) correspond to the encoding operations performed in respect of information block $IB_q$ to generate a first extension codeword $C_{q(1)}$ and a $i^{th}$ extension codeword $C_{q(i)}$ for a first IR-HARQ transmission and an $i^{th}$ IR-HARQ transmission, respectively.

As indicated in FIG. 11, encoding process 802(0) performs LDPC encoding by multiplying source word $S_q$ (corresponding to information block $IB_q$) with initial transmission a generator matrix G. Generator matrix G corresponds to original transmission PCM matrix H (hereinafter referred to as PCM matrix H(0)), which as noted above is derived from lifting a base PCM matrix $H_b$ (hereinafter referred to as base PCM matrix $H_b$(0)).

Each extension encoding process 802(*i*) (i>0), is configured to generate a respective codeword $C_{q(i)}$ that corresponds to the output of a respective generator matrix G(i) that for a respective PCM matrix H(i) that is an $i^{th}$ extension of the original transmission PCM matrix H(0). In example embodiments, the identical encoding operation 504 (i.e., the same generator matrix G) is applied in each of the extension coding processes 802(*i*). Accordingly, permutation operation 804 is configured to rearrange the information bits included in the original information block $IB_q$ to provide a permuted source word $s^{p'}_{(i)}$ that, when multiplied by generator matrix G, will result in an extended codeword $C_{q(i)}$ that is the equivalent of original source word $S_q$ (i.e., $IB_q$) multiplied by a respective generator matrix G(i) that corresponds to the respective PCM matrix H(i) that is an $i^{th}$ extension of the original transmission PCM matrix H(0).

In example embodiments, PCM matrix H(i) corresponds to a predefined permutation map n(i). In particular, a set of permutation maps n(i), ($1 \le i \le R_{max}$) is predetermined for each base LDPC code that can be used for an initial transmission. As noted above, IEEE std 802.11REVmdD4.0 that specifies a unique base PCM Hb (referred to hereafter as base PCM $H_b$(0)) for each particular combination of coding rate R and LDPC codeword length N. In example embodiments, a set of $R_{max}$ permutation maps {n(1), . . . , n($R_{max}$)} is defined for each base PCM $H_b$, thereby defining a respective a family of $R_{max}$ extension base PCMs {$H_b$(1) to $H_b(R_{max})$}.

In FIG. 11, LDPC codeword $C_{q(0)}$ corresponds to a mother LDPC code generated based on PCM H(0), and LDPC codeword {$C_{q(i)}$, . . . , $C_{q(Rmax)}$} correspond to respective extension LDPC codes generated based on PCMs {$H_b$(1) to $H_b(R_{max})$}, which are each derived from PCM $H_b$(0). In example embodiments, permutation maps are stored in a memory of AP 102.

Figure 13:
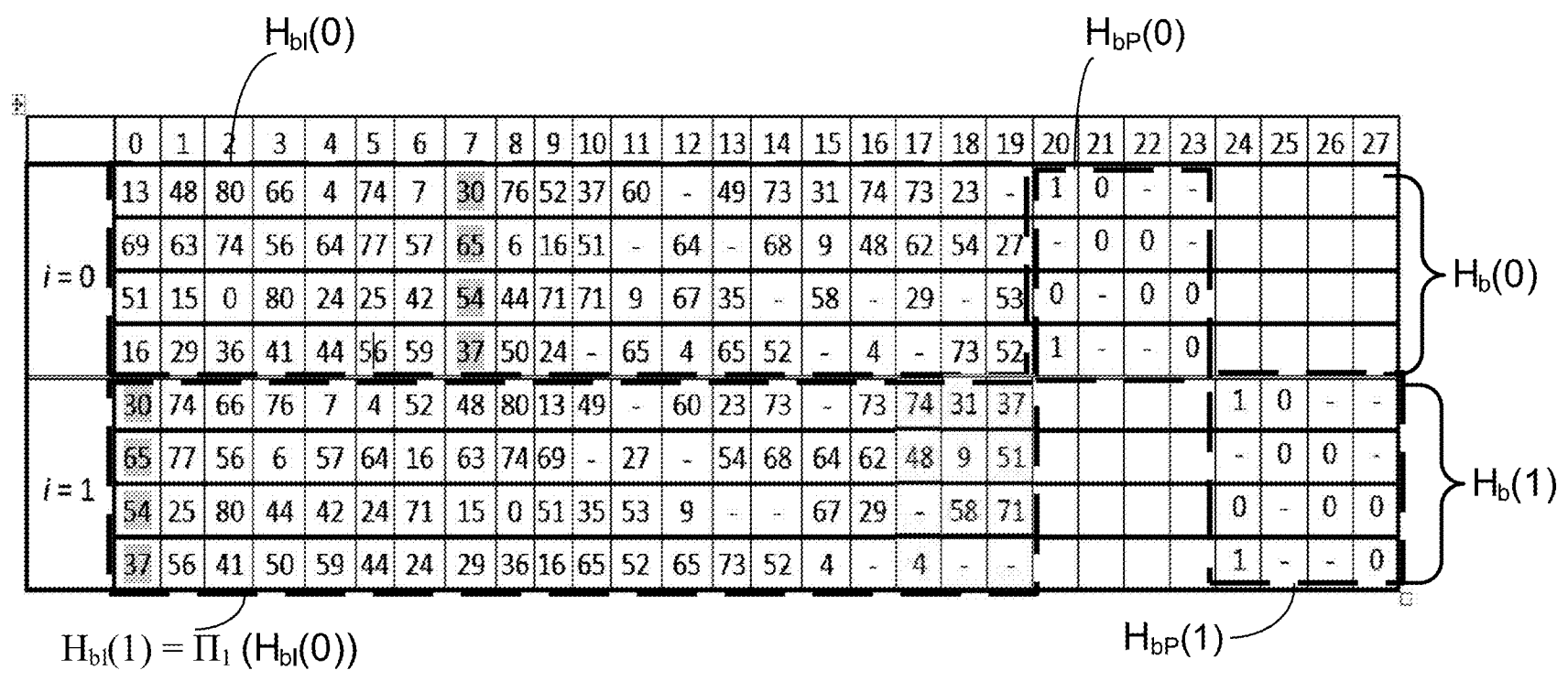

FIG. 12 illustrates a table that defines a set of $R_{max}$=15 permutation maps {n(1), . . . , n(15)} that can be applied to base PCM Hb defined in Table f-3(d) of 802.11REVmd4.0 (number of information columns k/Z=20) for coding rate 5/6 LDPC code with n=1944, k=1620 and Z=81. Each of the rows (indexed as i=1 to 15) corresponds to a respective permutation n(1), . . . , n(15). FIG. 13 shows an example of original PCM $H_b$(0) (e.g., as specified in IEEE std 802.11REVmdD4.0 and illustrated above in FIG. 10B)), and i=1 extension PCM $H_b$(1) as defined by permutation map n(1). As noted above, the base PCM $H_b$(0) includes two parts, namely an information bit part $H_{b1}$(0) which has a size of ((nb−kb)×kb)) and a parity bit part $H_{bp}$ which has a size of ((nb−kb)×(nb−kb), where kb=k/Z and nb=n/Z). As can be seen in FIG. 13, the base PCM Hb(1) includes three parts, namely an information bit part $H_{b1}$(1) which has a nominal size of ((nb−kb)×kb)), a null part (corresponding to the location of parity bit part $H_{bP}$(0) in the original PCM $H_b$(0)) and a parity bit part $H_{bP}$ which has a size of ((nb−kb)×(nb−kb)). The information bit part $H_{b1}$(1) of base PCM Hb(1) is generated by applying a permutation function to select a subset of permuted columns obtained from the original PCM PCM $H_b$(0), as defined by permutation map n(1), to the original base information part $H_{bI}$(0). The parity bit part $H_{bP}$ of PCM Hb(1) is generated by right-column shifting the parity bit part $H_{bP}$ of the original PCM Hb(0) by (nb−kb) columns, resulting in an extension to the matrix and a set of (nb−kb) null columns.

The table shown in FIG. 13 can collectively be represented as:

$$H_b = \begin{bmatrix} H_{bI}(0) & H_{bP} & 0 \\ \prod_1 (H_{bI}(0)) & 0 & H_{bP} \end{bmatrix}$$

where the first (nb−kb) rows of matrix $H_b$ denotes original PCM $H_b$(0) and the second (nb−kb) rows of matrix $H_b$ denotes first extension PCM $H_b$(1).

Referring to the table of FIG. 12, "fi" denotes a set of column indices that maps a respective column j (0≤j≤(kb−1)) in the original base information part $H_{b1}$(0) to a column j in the $i^{th}$ extension information part $H_{b1}$(i). Thus, each row in FIG. 12 specifies a permutation map $\Pi_i$ by providing, in a column location corresponding to the permuted code, a number that maps to a column corresponding to the original base information part $H_{b1}$(0). Accordingly, in the case of column indices set "f1" as defined by permutation and shortening map PM(1), the first extension information part $H_{b1}(1)$ is reduced to:

$f_1=\{f_1(j)\}=\{f_1(7), f_1(5), f_1(3), f_1(8), f_1(6), f_1(4), f_1(9),$
$f_1(1), f_1(2), f_1(0), f_1(13) f_1(19), f_1(11), f_1(18), f_1(14),$
$f_1(12), f_1(17), f_1(16), f_1(15), f_1(10)\}$

Where: $H_{b1}(0)$ Column j=7 is mapped to $H_{b1}(1)$ Column j=0

$H_{b1}(0)$ Column j=1 is mapped to $H_{b1}(1)$ Column j=7

And so on.

As noted above, in example embodiments the original generator matrix G is applied at LDPC encoding operation 504 in each extension encoding process 802(*i*) (i>0), and accordingly the source word $s_q$ must be manipulated by permutation operation 804 to enable the extension encoding process 802(*i*) to output the equivalent of an LDPC encoding operation that applies a unique generator matrix that corresponds to extension PCM H(i).

In this regard, the permutation operation 804 of extension encoding process 802(*i*) (i>0) is configured to rearrange the information bits in source word $S_q$ to generate a permuted sourceword $S_q^P(i)$ according to the permutation and shortening map n(i) that defines information bit part $H_{b1}(i)$ of base PCM Hb (i). In example embodiments, the set of $R_{max}$ permutation maps {n(1), ..., n($R_{max}$)} that are defined for each base PCM Hb define a respective set of permutations that can be respectively applied by the permutation operations 804 of the LDPC encoding processes 802($_1$) to 802 ($R_{max}$).

Reference is again made to FIG. 12 and example permutation map n(1). In example embodiments, the index values in the table row corresponding to permutation map n(1) map to a respective set of Z bits in the original source word $S_q$ and the location of the index values in the table row indicate where those Z bits should be located in permuted sourceword $S_q^P(i)$.

The information that is included in an retransmitted codeword $C_{q(i)}$ included in retransmission PPDU 300R may be different in different applications and embodiments. As noted above, the destination STA 104 is configured to store the interim and final decoding results for any codewords $c_j^T$ that are unsuccessfully decoded and thus labelled as unsuccessfully decoded. The LPDC coding scheme is systematic such that the destination STA 104 can combine information from the original codeword transmission with the extension information received in subsequent retransmissions.

IEEE std 802.11REVmdD4.0 that specifies a unique base PCM Hb (referred to hereafter as base PCM Hb(0)) for each particular combination of coding rate R and LDPC codeword length N. In example embodiments, a set of Rmax permutation maps {n(1), ..., n(Rmax)} is defined for each of a plurality of base PCMs Hb.

In this regard, the following tables indicate permuted extension LDPC code families generated for different LDPC codes that are specified in IEEE 802.11REVmdD4.0. The following tables present permutation map information in the same manner as described above in respect of FIG. 12. The tables each show the information column indices fi={fi(j)} of a base PCM for each permuting operation. Combining fi={fi(j)} as shown in the tables with the respective base PCM of LDPC codes defined in IEEE 802.11REVmdD4.0 provides the base PCM of the corresponding permuted extension (PE) LDPC retransmission codes.

Table 2A below corresponds to a permuted extension LDPC code family generated based on 802.11 LDPC code with code block length 1944, Z=81 and code rate 1/2. Combining fi={fi(j)} shown in the table 2A below and the base PCM for code block length n=1944, k=972, Z=81 and code rate 1/2 defined in [802.11REVmdD4.0 table F-3(a)] yields the base PCM of PE LDPC codes. The number of information columns of base PCM is k/Z=12. A family of LDPC codes is obtained by adding 972 (12*81) additional parity bits per generated extension.

TABLE 2A

Information column indices fi = {fi (j)} of base PCM of PE codes at the ith extension of 802.11 LDPC code (n = 1944, rate 1/2):

| | | j | | | | | | | | | | | |
|---|---|---|---|---|---|---|---|---|---|---|---|---|---|
| i | Rate | 0 | 1 | 2 | 3 | 4 | 5 | 6 | 7 | 8 | 9 | 10 | 11 |
| 0 | 0.500 | | | | | | | | | | | | |
| 1 | 0.333 | 4 | 7 | 10 | 2 | 0 | 9 | 6 | 3 | 8 | 1 | 11 | 5 |
| 2 | 0.250 | 0 | 1 | 6 | 2 | 8 | 3 | 7 | 9 | 4 | 11 | 5 | 10 |
| 3 | 0.200 | 4 | 1 | 3 | 5 | 8 | 7 | 11 | 6 | 0 | 9 | 10 | 2 |
| 4 | 0.167 | 8 | 6 | 1 | 3 | 0 | 5 | 10 | 9 | 4 | 7 | 2 | 11 |
| 5 | 0.143 | 8 | 11 | 10 | 3 | 4 | 1 | 6 | 2 | 0 | 9 | 5 | 7 |
| 6 | 0.125 | 8 | 1 | 6 | 5 | 0 | 11 | 2 | 3 | 4 | 10 | 7 | 9 |
| 7 | 0.111 | 0 | 7 | 2 | 9 | 4 | 5 | 11 | 10 | 8 | 6 | 3 | 1 |
| 8 | 0.100 | 8 | 9 | 3 | 2 | 0 | 5 | 10 | 1 | 4 | 6 | 11 | 7 |

Table 2B below corresponds to a permuted extension LDPC code family generated based on 802.11 LDPC code with code block length 1944, Z=81 and code rate 2/3. Combining f_i={f_i(j)} shown in Table 2B below and base PCM with code block length n=1944, k=1296, Z=81 and code rate 2/3 as defined in [Table F-3(b), 802.11REVmdD4.0] yields the base PCM of PE LDPC codes. The number of information columns of base PCM is k/Z=16. A family of LDPC codes is obtained by adding 648 (8×81) additional parity bits generated per extension.

TABLE 2B

Information column indices fi = {fi (j)} of base PCM of PE codes at the ith extension of the 802.11 LDPC code (n = 1944, rate 2/3):

| | | j | | | | | | | | | | | | | | | |
|---|---|---|---|---|---|---|---|---|---|---|---|---|---|---|---|---|---|
| i | Rate | 0 | 1 | 2 | 3 | 4 | 5 | 6 | 7 | 8 | 9 | 10 | 11 | 12 | 13 | 14 | 15 |
| 0 | 0.667 | | | | | | | | | | | | | | | | |
| 1 | 0.500 | 2 | 1 | 4 | 0 | 3 | 5 | 6 | 10 | 7 | 13 | 12 | 14 | 8 | 11 | 15 | 9 |
| 2 | 0.400 | 0 | 4 | 2 | 1 | 3 | 15 | 11 | 9 | 10 | 13 | 12 | 7 | 8 | 14 | 5 | 6 |
| 3 | 0.333 | 3 | 1 | 2 | 4 | 0 | 12 | 14 | 7 | 6 | 5 | 9 | 15 | 11 | 10 | 8 | 13 |
| 4 | 0.286 | 4 | 2 | 3 | 1 | 0 | 6 | 11 | 14 | 5 | 13 | 9 | 8 | 15 | 7 | 12 | 10 |
| 5 | 0.250 | 0 | 1 | 2 | 3 | 4 | 5 | 13 | 15 | 9 | 10 | 6 | 7 | 14 | 8 | 12 | 11 |
| 6 | 0.222 | 4 | 0 | 1 | 3 | 2 | 14 | 11 | 10 | 5 | 9 | 8 | 12 | 13 | 6 | 7 | 15 |
| 7 | 0.200 | 1 | 2 | 3 | 4 | 0 | 11 | 9 | 13 | 15 | 5 | 14 | 12 | 6 | 8 | 7 | 10 |

TABLE 2B-continued

Information column indices fi = {fi (j)} of base PCM of PE codes
at the ith extension of the 802.11 LDPC code (n = 1944, rate 2/3):

| i | Rate | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 8 | 0.182 | 0 | 4 | 3 | 1 | 2 | 7 | 6 | 13 | 15 | 12 | 9 | 5 | 8 | 14 | 11 | 10 |
| 9 | 0.167 | 0 | 1 | 2 | 4 | 3 | 8 | 14 | 6 | 10 | 15 | 13 | 7 | 9 | 11 | 5 | 12 |
| 10 | 0.154 | 2 | 4 | 0 | 1 | 3 | 11 | 10 | 5 | 6 | 13 | 7 | 15 | 8 | 9 | 12 | 14 |

Table 2C below corresponds to a permuted extension LDPC code family generated based on 802.11 LDPC code with code block length 1944, Z=81 and code rate 3/4. Combining fi={fi(j)} shown in the table 2C below and the base PCM matrix with code block length n=1944, k=1458, Z=81 and code rate 3/4 defined in [Table F-3(c), 802.11REVmdD4.0] yields the base PCM of PE LDPC codes. The number of information columns of base PCM is k/Z=18. A family of LDPC codes is obtained by adding 486 (6×81) additional parity bits generated per extension.

TABLE 2C

Information column indices f_i = {f_i (j)} of base PCM of PES codes
at the ith extension of the 802.11 LDPC code (n = 1944, rate 3/4):

| i | Rate | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| 0 | 0.750 | | | | | | | | | | | | | | | | | | |
| 1 | 0.600 | 1 | 2 | 11 | 3 | 0 | 4 | 16 | 7 | 14 | 12 | 10 | 17 | 13 | 15 | 5 | 9 | 8 | 6 |
| 2 | 0.500 | 3 | 11 | 1 | 4 | 0 | 2 | 8 | 14 | 9 | 13 | 10 | 17 | 15 | 5 | 7 | 16 | 12 | 6 |
| 3 | 0.429 | 3 | 4 | 0 | 5 | 2 | 11 | 13 | 8 | 14 | 15 | 1 | 17 | 12 | 9 | 16 | 7 | 10 | 6 |
| 4 | 0.375 | 4 | 2 | 3 | 11 | 1 | 0 | 13 | 6 | 8 | 9 | 15 | 14 | 5 | 7 | 16 | 17 | 10 | 12 |
| 5 | 0.333 | 3 | 2 | 0 | 5 | 11 | 1 | 13 | 10 | 7 | 9 | 4 | 15 | 17 | 6 | 14 | 12 | 16 | 8 |
| 6 | 0.300 | 4 | 0 | 11 | 2 | 1 | 3 | 6 | 7 | 12 | 9 | 14 | 16 | 10 | 5 | 15 | 13 | 8 | 17 |
| 7 | 0.273 | 0 | 11 | 2 | 5 | 3 | 4 | 7 | 8 | 12 | 16 | 6 | 13 | 1 | 17 | 9 | 10 | 15 | 14 |
| 8 | 0.250 | 2 | 4 | 5 | 0 | 3 | 11 | 6 | 14 | 7 | 9 | 8 | 10 | 17 | 1 | 15 | 13 | 16 | 12 |
| 9 | 0.231 | 5 | 4 | 0 | 2 | 3 | 11 | 6 | 13 | 14 | 15 | 17 | 7 | 8 | 16 | 10 | 1 | 12 | 9 |
| 10 | 0.214 | 4 | 2 | 5 | 1 | 0 | 11 | 3 | 6 | 17 | 14 | 13 | 8 | 10 | 12 | 7 | 9 | 15 | 16 |
| 11 | 0.200 | 0 | 11 | 3 | 4 | 14 | 1 | 16 | 7 | 8 | 17 | 15 | 10 | 6 | 5 | 9 | 13 | 12 | 2 |
| 12 | 0.188 | 4 | 1 | 2 | 14 | 3 | 0 | 12 | 8 | 6 | 17 | 16 | 11 | 10 | 15 | 13 | 7 | 9 | 5 |
| 13 | 0.176 | 11 | 3 | 2 | 1 | 0 | 4 | 9 | 15 | 7 | 10 | 16 | 13 | 14 | 12 | 8 | 6 | 5 | 17 |
| 14 | 0.167 | 5 | 2 | 3 | 4 | 0 | 11 | 15 | 12 | 17 | 8 | 7 | 10 | 13 | 6 | 16 | 1 | 14 | 9 |
| 15 | 0.158 | 5 | 11 | 4 | 0 | 2 | 1 | 17 | 12 | 10 | 13 | 7 | 14 | 9 | 16 | 6 | 3 | 15 | 8 |

Table 2D below corresponds to a permuted extension LDPC code family generated based on 802.11 LDPC code with code block length 1944, Z=81 and code rate 5/6. Combining fi={fi(j)} shown in the table 2D below and the base PCM matrix with code block length n=1944, k=1620, Z=81 and code rate 5/6 defined in Table F-3(d) in 802.11REVmdD4.0 yields the base PCM of PE LDPC codes The number of information columns of base PCM is k/Z=20. A family of LDPC codes is obtained by adding 324 (4×81) additional parity bits generated per extension.

TABLE 2D

Information column indices f_i = {f_i (j)} of base PCM of PES codes
at the ith extension of the 802.11 LDPC code (n = 1944, rate 5/6):

| i | Rate | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| 0 | 0.833 | | | | | | | | | | | | | | | | | | | | |
| 1 | 0.714 | 7 | 5 | 3 | 8 | 6 | 4 | 9 | 1 | 2 | 0 | 13 | 19 | 11 | 18 | 14 | 12 | 17 | 16 | 15 | 10 |
| 2 | 0.625 | 1 | 7 | 0 | 5 | 6 | 8 | 9 | 3 | 4 | 14 | 10 | 16 | 19 | 17 | 2 | 13 | 11 | 15 | 12 | 18 |
| 3 | 0.556 | 16 | 6 | 0 | 1 | 9 | 5 | 7 | 17 | 8 | 4 | 12 | 14 | 19 | 18 | 11 | 13 | 10 | 2 | 3 | 15 |
| 4 | 0.500 | 17 | 11 | 0 | 9 | 6 | 19 | 4 | 5 | 8 | 1 | 18 | 2 | 3 | 13 | 14 | 15 | 7 | 12 | 10 | 16 |
| 5 | 0.455 | 4 | 3 | 8 | 19 | 18 | 6 | 0 | 16 | 14 | 9 | 2 | 17 | 12 | 7 | 1 | 15 | 5 | 13 | 10 | 11 |
| 6 | 0.417 | 3 | 8 | 6 | 9 | 19 | 0 | 16 | 10 | 11 | 7 | 17 | 5 | 15 | 14 | 12 | 18 | 2 | 4 | 13 | 1 |
| 7 | 0.385 | 5 | 17 | 4 | 19 | 8 | 3 | 0 | 7 | 6 | 9 | 12 | 18 | 1 | 11 | 13 | 14 | 15 | 10 | 16 | 2 |
| 8 | 0.357 | 19 | 8 | 2 | 0 | 9 | 6 | 4 | 13 | 3 | 5 | 1 | 17 | 14 | 10 | 12 | 7 | 11 | 18 | 16 | 15 |
| 9 | 0.333 | 9 | 8 | 16 | 1 | 6 | 4 | 5 | 2 | 3 | 7 | 14 | 15 | 0 | 12 | 19 | 17 | 10 | 13 | 18 | 11 |

TABLE 2D-continued

Information column indices f_i = {f_i (j)} of base PCM of PES codes
at the ith extension of the 802.11 LDPC code (n = 1944, rate 5/6):

| i | Rate | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| 10 | 0.313 | 4 | 2 | 10 | 11 | 0 | 9 | 1 | 8 | 19 | 6 | 7 | 17 | 18 | 16 | 12 | 14 | 5 | 13 | 3 | 15 |
| 11 | 0.294 | 9 | 13 | 5 | 4 | 17 | 14 | 16 | 3 | 1 | 19 | 7 | 15 | 0 | 8 | 6 | 18 | 2 | 11 | 12 | 10 |
| 12 | 0.278 | 11 | 9 | 0 | 18 | 12 | 2 | 7 | 4 | 1 | 3 | 10 | 15 | 16 | 13 | 19 | 14 | 17 | 5 | 8 | 6 |
| 13 | 0.263 | 2 | 12 | 6 | 7 | 15 | 10 | 4 | 9 | 8 | 1 | 14 | 19 | 16 | 13 | 5 | 3 | 17 | 11 | 18 | 0 |
| 14 | 0.25 | 11 | 5 | 3 | 14 | 17 | 1 | 18 | 9 | 13 | 10 | 19 | 8 | 7 | 6 | 4 | 0 | 16 | 12 | 2 | 15 |
| 15 | 0.238 | 9 | 0 | 5 | 1 | 4 | 16 | 7 | 14 | 3 | 8 | 13 | 18 | 10 | 6 | 2 | 17 | 12 | 19 | 15 | 11 |

Table 3a below correspond to a permuted extension LDPC code family generated based on 802.11 LDPC code with code block length 1296, Z=54 and code rate 1/2. 802.11 LDPC code with code block length n=1296, k=648, Z=54 and code rate 1/2 is defined in [Table F-2(a), 802.11REVmdD4.0]. The number of information columns of base PCM is k/Z=12. A family of LDPC codes is obtained by adding 648 (12×54) additional parity bits generated per extension.

Table 3A shows the information column indices $f_i=\{f_i(j)\}$ of base PCM at each permuting operation. Combining $f_i=\{f_i(j)\}$ shown in Table 3A and Table F-2(a) in 802.11REVmdD4.0 yields the PCM of PE LDPC codes.

Table 3B below corresponds to a permuted extension LDPC code family generated based on 802.11 LDPC code with code block length 1296, Z=54 and code rate 2/3. 802.11 LDPC code with code block length n=1296, k=864, Z=54 and code rate 2/3 is defined in [Table F-2(b), 802.11REVmdD4.0]. The number of information columns of base PCM is k/Z=16. A family of LDPC codes is obtained by adding 432 (8×54) additional parity bits generated per extension.

Table 3B shows the information column indices $f_i=\{f_i(j)\}$ of base PCM at each permuting operation. Combining $f_i=\{f_i(j)\}$ shown in Table 3B below and Table F-2(b) in 802.11REVmdD4.0 yields the base PCM of PE LDPC codes.

TABLE 3B

Information column indices $f_i = \{f_i(j)\}$ of base PCM of PE codes
at the ith extension of the 802.11 LDPC code (n = 1296, rate 2/3):

| i | Rate | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 0.667 | | | | | | | | | | | | | | | | |
| 1 | 0.500 | 2 | 1 | 4 | 0 | 3 | 5 | 6 | 10 | 7 | 13 | 12 | 14 | 8 | 11 | 15 | 9 |
| 2 | 0.400 | 2 | 4 | 1 | 3 | 0 | 8 | 11 | 13 | 14 | 6 | 15 | 12 | 7 | 10 | 9 | 5 |
| 3 | 0.333 | 3 | 1 | 2 | 4 | 0 | 12 | 14 | 7 | 6 | 5 | 9 | 15 | 11 | 10 | 8 | 13 |
| 4 | 0.286 | 4 | 2 | 3 | 1 | 0 | 6 | 11 | 14 | 5 | 13 | 9 | 8 | 15 | 7 | 12 | 10 |
| 5 | 0.250 | 0 | 1 | 2 | 3 | 4 | 5 | 13 | 15 | 9 | 10 | 6 | 7 | 14 | 8 | 12 | 11 |
| 6 | 0.222 | 4 | 0 | 1 | 3 | 2 | 14 | 11 | 10 | 5 | 9 | 8 | 12 | 13 | 6 | 7 | 15 |
| 7 | 0.200 | 1 | 2 | 3 | 4 | 0 | 11 | 9 | 13 | 15 | 5 | 14 | 12 | 6 | 8 | 7 | 10 |
| 8 | 0.182 | 0 | 4 | 3 | 1 | 2 | 7 | 6 | 13 | 15 | 12 | 9 | 5 | 8 | 14 | 11 | 10 |
| 9 | 0.167 | 0 | 1 | 2 | 4 | 3 | 8 | 14 | 6 | 10 | 15 | 13 | 7 | 9 | 11 | 5 | 12 |
| 10 | 0.154 | 2 | 4 | 0 | 1 | 3 | 11 | 10 | 5 | 6 | 13 | 7 | 15 | 8 | 9 | 12 | 14 |

TABLE 3A

Information column indices $f_i = \{f_i(j)\}$ of base PCM of PE codes
at the ith extension of 802.11 LDPC code (n = 1296, rate 1/2):

| i | Rate | 0 | 1 | 2 | 3 | 4 | 5 | 6 | 7 | 8 | 9 | 10 | 11 |
|---|---|---|---|---|---|---|---|---|---|---|---|---|---|
| 0 | 0.500 | | | | | | | | | | | | |
| 1 | 0.333 | 4 | 7 | 5 | 11 | 0 | 2 | 10 | 6 | 8 | 1 | 9 | 3 |
| 2 | 0.250 | 8 | 6 | 11 | 1 | 4 | 2 | 10 | 9 | 0 | 3 | 5 | 7 |
| 3 | 0.200 | 4 | 6 | 1 | 9 | 8 | 5 | 3 | 7 | 0 | 10 | 2 | 11 |
| 4 | 0.167 | 8 | 6 | 1 | 3 | 0 | 5 | 10 | 9 | 4 | 7 | 2 | 11 |
| 5 | 0.143 | 0 | 1 | 7 | 6 | 4 | 2 | 11 | 3 | 8 | 10 | 5 | 9 |
| 6 | 0.125 | 8 | 9 | 3 | 5 | 4 | 10 | 2 | 1 | 0 | 6 | 7 | 11 |
| 7 | 0.111 | 8 | 2 | 11 | 6 | 4 | 7 | 10 | 5 | 0 | 9 | 1 | 3 |
| 8 | 0.100 | 8 | 9 | 3 | 2 | 0 | 5 | 10 | 1 | 4 | 6 | 11 | 7 |

Table 3C below corresponds to a permuted extension LDPC code family generated based on 802.11 LDPC code with code block length 1296, Z=54 and code rate 3/4. 802.11 LDPC code with code block length n=1296, k=972, Z=54 and code rate 3/4 is defined in [Table F-2(c), 802.11REVmdD4.0]. The number of information columns of base PCM is k/Z=18. A family of LDPC codes is obtained by adding 324 (6×54) additional parity bits generated per extension.

Table 3C shows the information column indices $f_i=\{f_i(j)\}$ of base PCM at each permuting operation. Combining $f_i=\{f_i(j)\}$ shown in Table 3C below and Table F-2(c) in 802.11REVmdD4.0 yields the base PCM of PE LDPC codes.

TABLE 3C

Information column indices $f_i = \{f_i(j)\}$ of base PCM of PE codes
at the ith extension of the 802.11 LDPC code (n = 1296, rate 3/4):

| | | j | | | | | | | | | | | | | | | | | |
|---|---|---|---|---|---|---|---|---|---|---|---|---|---|---|---|---|---|---|---|
| i | Rate | 0 | 1 | 2 | 3 | 4 | 5 | 6 | 7 | 8 | 9 | 10 | 11 | 12 | 13 | 14 | 15 | 16 | 17 |
| 0 | 0.750 | | | | | | | | | | | | | | | | | | |
| 1 | 0.600 | 2 | 4 | 3 | 14 | 5 | 0 | 6 | 15 | 1 | 13 | 17 | 16 | 12 | 8 | 11 | 10 | 7 | 9 |
| 2 | 0.500 | 2 | 3 | 14 | 6 | 4 | 5 | 0 | 8 | 17 | 10 | 16 | 12 | 9 | 1 | 15 | 7 | 11 | 13 |
| 3 | 0.429 | 6 | 8 | 5 | 4 | 3 | 0 | 2 | 16 | 13 | 11 | 15 | 10 | 1 | 14 | 17 | 7 | 9 | 12 |
| 4 | 0.375 | 6 | 1 | 2 | 3 | 4 | 0 | 5 | 11 | 17 | 7 | 14 | 10 | 15 | 12 | 16 | 8 | 9 | 13 |
| 5 | 0.333 | 2 | 4 | 3 | 8 | 5 | 0 | 6 | 11 | 16 | 14 | 1 | 10 | 9 | 15 | 12 | 7 | 17 | 13 |
| 6 | 0.300 | 3 | 0 | 4 | 5 | 6 | 9 | 2 | 11 | 1 | 12 | 13 | 16 | 15 | 8 | 14 | 7 | 17 | 10 |
| 7 | 0.273 | 2 | 5 | 6 | 0 | 3 | 8 | 4 | 9 | 11 | 1 | 7 | 12 | 15 | 13 | 14 | 16 | 17 | 10 |
| 8 | 0.250 | 6 | 3 | 0 | 2 | 5 | 4 | 8 | 1 | 13 | 14 | 16 | 10 | 11 | 9 | 7 | 15 | 17 | 12 |
| 9 | 0.231 | 6 | 0 | 4 | 2 | 12 | 5 | 3 | 11 | 9 | 13 | 1 | 15 | 17 | 16 | 8 | 7 | 14 | 10 |
| 10 | 0.214 | 6 | 8 | 0 | 2 | 3 | 5 | 4 | 10 | 16 | 11 | 15 | 14 | 13 | 9 | 12 | 1 | 17 | 7 |
| 11 | 0.200 | 2 | 4 | 11 | 5 | 3 | 6 | 0 | 17 | 1 | 8 | 9 | 16 | 12 | 15 | 10 | 7 | 13 | 14 |
| 12 | 0.188 | 14 | 5 | 8 | 6 | 3 | 2 | 0 | 13 | 17 | 7 | 15 | 1 | 9 | 16 | 11 | 12 | 4 | 10 |
| 13 | 0.176 | 2 | 4 | 5 | 3 | 0 | 14 | 6 | 1 | 15 | 16 | 13 | 12 | 7 | 10 | 9 | 17 | 8 | 11 |
| 14 | 0.167 | 9 | 0 | 8 | 2 | 5 | 4 | 3 | 15 | 1 | 17 | 6 | 16 | 14 | 13 | 11 | 10 | 12 | 7 |
| 15 | 0.158 | 6 | 0 | 5 | 4 | 3 | 14 | 2 | 10 | 1 | 17 | 11 | 7 | 12 | 8 | 13 | 15 | 9 | 16 |

Table 3D below corresponds to a permuted extension LDPC code family generated based on 802.11 LDPC code with code block length 1296, Z=54 and code rate 5/6. 802.11 LDPC code with code block length n=1296, k=1080, Z=54 and code rate 5/6 is defined in [Table F-2(d), 802.11REVmdD4.0]. The number of information columns of base PCM is k/Z=20. A family of LDPC codes is obtained by adding 216 (4×54) additional parity bits generated per extension. Table 3D shows the information column indices $f_i=\{f_i(j)\}$ of base PCM at each permuting operation. Combining $f_i=\{f_i(j)\}$ shown in Table 3D below and Table F-2(d) in 802.11REVmdD4.0 yields the base PCM of PE LDPC codes.

TABLE 3D

Information column indices $f_i = \{f_i(j)\}$ of base PCM of PE codes
at the ith extension of the 802.11 LDPC code (n = 1296, rate 5/6):

| | | j | | | | | | | | | | | | | | | | | | | |
|---|---|---|---|---|---|---|---|---|---|---|---|---|---|---|---|---|---|---|---|---|---|
| i | Rate | 0 | 1 | 2 | 3 | 4 | 5 | 6 | 7 | 8 | 9 | 10 | 11 | 12 | 13 | 14 | 15 | 16 | 17 | 18 | 19 |
| 0 | 0.833 | | | | | | | | | | | | | | | | | | | | |
| 1 | 0.714 | 2 | 9 | 14 | 7 | 5 | 1 | 4 | 12 | 0 | 15 | 3 | 13 | 10 | 8 | 16 | 6 | 18 | 19 | 11 | 17 |
| 2 | 0.625 | 7 | 1 | 5 | 2 | 15 | 8 | 14 | 17 | 0 | 4 | 10 | 13 | 12 | 6 | 9 | 3 | 11 | 18 | 19 | 16 |
| 3 | 0.556 | 13 | 15 | 12 | 1 | 5 | 7 | 11 | 6 | 19 | 4 | 0 | 3 | 10 | 8 | 9 | 16 | 14 | 2 | 17 | 18 |
| 4 | 0.500 | 8 | 14 | 7 | 17 | 1 | 11 | 0 | 19 | 9 | 2 | 5 | 15 | 16 | 12 | 10 | 4 | 6 | 18 | 13 | 3 |
| 5 | 0.455 | 0 | 1 | 6 | 13 | 11 | 17 | 9 | 2 | 10 | 3 | 12 | 7 | 16 | 8 | 5 | 15 | 18 | 14 | 4 | 19 |
| 6 | 0.417 | 6 | 9 | 14 | 7 | 5 | 15 | 19 | 11 | 17 | 13 | 8 | 2 | 4 | 12 | 3 | 18 | 0 | 10 | 16 | 1 |
| 7 | 0.385 | 2 | 8 | 9 | 1 | 15 | 13 | 16 | 4 | 17 | 10 | 14 | 11 | 6 | 3 | 5 | 19 | 12 | 0 | 18 | 7 |
| 8 | 0.357 | 0 | 6 | 12 | 3 | 15 | 11 | 9 | 13 | 7 | 4 | 5 | 8 | 2 | 16 | 1 | 10 | 19 | 18 | 17 | 14 |
| 9 | 0.333 | 14 | 0 | 12 | 7 | 9 | 1 | 8 | 15 | 2 | 4 | 10 | 13 | 11 | 5 | 18 | 17 | 16 | 19 | 3 | 6 |
| 10 | 0.313 | 8 | 1 | 12 | 13 | 16 | 11 | 3 | 7 | 9 | 0 | 10 | 4 | 5 | 19 | 15 | 2 | 6 | 18 | 14 | 17 |
| 11 | 0.294 | 9 | 13 | 5 | 4 | 17 | 14 | 16 | 3 | 1 | 19 | 7 | 15 | 0 | 8 | 6 | 18 | 2 | 11 | 12 | 10 |
| 12 | 0.278 | 11 | 9 | 0 | 18 | 12 | 2 | 7 | 4 | 1 | 3 | 10 | 15 | 16 | 13 | 19 | 14 | 17 | 5 | 8 | 6 |
| 13 | 0.263 | 12 | 8 | 10 | 13 | 16 | 15 | 11 | 0 | 14 | 1 | 3 | 19 | 4 | 5 | 9 | 18 | 7 | 2 | 6 | 17 |
| 14 | 0.25 | 11 | 5 | 3 | 14 | 17 | 1 | 18 | 9 | 13 | 10 | 19 | 8 | 7 | 6 | 4 | 0 | 16 | 12 | 2 | 15 |
| 15 | 0.238 | 1 | 18 | 3 | 4 | 16 | 9 | 5 | 14 | 11 | 17 | 15 | 13 | 0 | 7 | 2 | 8 | 19 | 6 | 12 | 10 |

Table 4A below corresponds to an extension LDPC code family generated based on 802.11 LDPC code with code block length 648, Z=27 and code rate 1/2. 802.11 LDPC code with code block length n=648, k=324, Z=27 and code rate 1/2 is defined in [Table F-1(a), 802.11REVmdD4.0]. The number of information columns of base PCM is k/Z=12. A family of LDPC codes is obtained by adding 324 (12×27) additional parity bits generated per extension. Table 4A shows the information column indices $f_i=\{f_i(j)\}$ of base PCM at each permuting operation. Combining $f_i=\{f_i(j)\}$ shown in Table 4A below and Table F-1(a) in 802.11REVmdD4.0 yields the PCM of PE LDPC codes.

TABLE 4A

Information column indices $f_i = \{f_i(j)\}$ of base PCM of PE codes at the ith extension of 802.11 LDPC code (n = 648, rate 1/2):

| i | Rate | 0 | 1 | 2 | 3 | 4 | 5 | 6 | 7 | 8 | 9 | 10 | 11 |
|---|---|---|---|---|---|---|---|---|---|---|---|---|---|
| 0 | 0.500 | | | | | | | | | | | | |
| 1 | 0.333 | 0 | 6 | 2 | 9 | 4 | 7 | 3 | 1 | 8 | 10 | 5 | 11 |
| 2 | 0.250 | 0 | 1 | 6 | 2 | 8 | 3 | 7 | 9 | 4 | 11 | 5 | 10 |
| 3 | 0.200 | 8 | 2 | 3 | 6 | 4 | 9 | 7 | 1 | 0 | 11 | 5 | 10 |

TABLE 4A-continued

Information column indices $f_i = \{f_i(j)\}$ of base PCM of PE codes at the ith extension of 802.11 LDPC code (n = 648, rate 1/2):

| i | Rate | 0 | 1 | 2 | 3 | 4 | 5 | 6 | 7 | 8 | 9 | 10 | 11 |
|---|---|---|---|---|---|---|---|---|---|---|---|---|---|
| 4 | 0.167 | 4 | 6 | 7 | 5 | 0 | 1 | 9 | 2 | 8 | 3 | 11 | 10 |
| 5 | 0.143 | 8 | 3 | 5 | 6 | 4 | 2 | 9 | 1 | 0 | 7 | 10 | 11 |
| 6 | 0.125 | 4 | 7 | 1 | 2 | 8 | 6 | 9 | 3 | 0 | 5 | 11 | 10 |
| 7 | 0.111 | 3 | 1 | 10 | 6 | 4 | 7 | 9 | 2 | 0 | 3 | 11 | 5 |

Table 4B below corresponds to a permuted extension LDPC code family generated based on 802.11 LDPC code with code block length 648, Z=27 and code rate 2/3. 802.11 LDPC code with code block length n=648, k=432, Z=27 and code rate 2/3 is defined in [Table F-1(b), 802.11REVmdD4.0]. The number of information columns of base PCM is k/Z=16. A family of LDPC codes is obtained by adding 216 (8×27) additional parity bits generated per extension. Table 4B shows the information column indices $f_i=\{f_i(j)\}$ of base PCM at each permuting operation. Combining $f_i=\{f_i(j)\}$ shown in Table 4B below and Table F-1(b) in 802.11REVmdD4.0 yields the PCM of PE LDPC codes.

TABLE 4B

Information column indices $f_i = \{f_i(j)\}$ of base PCM of PE codes at the ith extension of the 802.11 LDPC code (n = 648, rate 2/3):

| i | Rate | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| 0 | 0.667 | | | | | | | | | | | | | | | | |
| 1 | 0.500 | 0 | 1 | 2 | 3 | 7 | 11 | 15 | 12 | 5 | 8 | 4 | 13 | 9 | 10 | 14 | 6 |
| 2 | 0.400 | 1 | 2 | 0 | 3 | 12 | 4 | 11 | 10 | 15 | 13 | 14 | 6 | 7 | 8 | 9 | 5 |
| 3 | 0.333 | 2 | 1 | 0 | 3 | 12 | 4 | 10 | 11 | 7 | 15 | 9 | 5 | 8 | 6 | 13 | 14 |
| 4 | 0.286 | 0 | 1 | 2 | 3 | 10 | 9 | 7 | 4 | 13 | 5 | 14 | 8 | 12 | 15 | 6 | 11 |
| 5 | 0.250 | 0 | 1 | 2 | 3 | 4 | 5 | 13 | 15 | 9 | 10 | 6 | 7 | 14 | 8 | 12 | 11 |
| 6 | 0.222 | 0 | 2 | 3 | 1 | 8 | 7 | 5 | 4 | 13 | 10 | 11 | 6 | 12 | 14 | 15 | 9 |
| 7 | 0.200 | 3 | 1 | 2 | 0 | 15 | 5 | 10 | 7 | 4 | 9 | 14 | 13 | 6 | 11 | 8 | 12 |
| 8 | 0.182 | 0 | 2 | 1 | 3 | 15 | 4 | 12 | 7 | 9 | 13 | 11 | 8 | 5 | 10 | 14 | 6 |
| 9 | 0.167 | 1 | 2 | 0 | 3 | 4 | 10 | 8 | 13 | 6 | 12 | 11 | 5 | 9 | 7 | 15 | 14 |
| 10 | 0.154 | 2 | 0 | 1 | 3 | 10 | 9 | 7 | 15 | 6 | 11 | 5 | 12 | 4 | 13 | 8 | 14 |

Table 4C below corresponds to a permuted extension LDPC code family generated based on 802.11 LDPC code with code block length 648, Z=27 and code rate 3/4. 802.11 LDPC code with code block length n=648, k=486, Z=27 and code rate 3/4 is defined in [Table F-1(c), 802.11REVmdD4.0]. The number of information columns of base PCM is k/Z=18. A family of LDPC codes is obtained by adding 162 (6×27) additional parity bits generated per extension. Table 4C shows the information column indices $f_i=\{f_i(j)\}$ of base PCM at each permuting operation. Combining $f_i=\{f_i(j)\}$ shown in Table 4C and Table F-1(c) in 802.11REVmdD4.0 yields the PCM of PE LDPC codes.

TABLE 4C

Information column indices $f_i = \{f_i(j)\}$ of base PCM of PE codes at the ith extension of the 802.11 LDPC code (n = 648, rate 3/4):

| i | Rate | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| 0 | 0.750 | | | | | | | | | | | | | | | | | | |
| 1 | 0.600 | 1 | 0 | 4 | 3 | 6 | 17 | 8 | 5 | 2 | 9 | 10 | 14 | 11 | 12 | 7 | 16 | 13 | 15 |
| 2 | 0.500 | 3 | 0 | 4 | 2 | 6 | 9 | 11 | 5 | 1 | 14 | 10 | 12 | 16 | 17 | 8 | 15 | 7 | 13 |

TABLE 4C-continued

Information column indices $f_i = \{f_i(j)\}$ of base PCM of PE codes
at the ith extension of the 802.11 LDPC code (n = 648, rate 3/4):

| i | Rate | 0 | 1 | 2 | 3 | 4 | 5 | 6 | 7 | 8 | 9 | 10 | 11 | 12 | 13 | 14 | 15 | 16 | 17 |
|---|------|---|---|---|---|---|---|---|---|---|---|----|----|----|----|----|----|----|----|
| 3 | 0.429 | 1 | 6 | 3 | 2 | 0 | 14 | 12 | 9 | 11 | 8 | 17 | 4 | 16 | 5 | 13 | 10 | 7 | 15 |
| 4 | 0.375 | 1 | 0 | 10 | 3 | 6 | 7 | 11 | 2 | 5 | 4 | 9 | 17 | 15 | 8 | 16 | 12 | 14 | 13 |
| 5 | 0.333 | 6 | 2 | 3 | 5 | 0 | 7 | 1 | 9 | 10 | 4 | 13 | 11 | 12 | 8 | 17 | 14 | 16 | 15 |
| 6 | 0.300 | 2 | 3 | 1 | 5 | 0 | 4 | 9 | 8 | 6 | 15 | 10 | 7 | 14 | 12 | 17 | 16 | 11 | 13 |
| 7 | 0.273 | 1 | 0 | 3 | 2 | 6 | 15 | 4 | 11 | 17 | 8 | 5 | 9 | 10 | 7 | 16 | 13 | 14 | 12 |
| 8 | 0.250 | 1 | 0 | 2 | 3 | 6 | 4 | 8 | 5 | 14 | 11 | 9 | 10 | 12 | 13 | 16 | 15 | 7 | 17 |
| 9 | 0.231 | 1 | 2 | 6 | 4 | 3 | 7 | 10 | 13 | 17 | 0 | 16 | 5 | 8 | 15 | 12 | 9 | 11 | 14 |
| 10 | 0.214 | 6 | 0 | 1 | 3 | 2 | 15 | 16 | 17 | 5 | 13 | 7 | 11 | 8 | 14 | 9 | 12 | 4 | 10 |
| 11 | 0.200 | 0 | 2 | 14 | 6 | 1 | 10 | 13 | 4 | 9 | 3 | 15 | 5 | 16 | 17 | 11 | 8 | 12 | 7 |
| 12 | 0.188 | 1 | 6 | 0 | 3 | 9 | 4 | 13 | 2 | 12 | 5 | 16 | 10 | 7 | 8 | 15 | 14 | 11 | 17 |
| 13 | 0.176 | 0 | 1 | 9 | 3 | 6 | 12 | 14 | 10 | 5 | 4 | 2 | 8 | 17 | 11 | 7 | 13 | 16 | 15 |
| 14 | 0.167 | 9 | 0 | 2 | 3 | 6 | 15 | 5 | 13 | 8 | 11 | 4 | 14 | 16 | 1 | 7 | 17 | 12 | 10 |
| 15 | 0.158 | 6 | 2 | 0 | 3 | 1 | 8 | 10 | 9 | 11 | 14 | 15 | 13 | 12 | 16 | 17 | 7 | 5 | 4 |

Table 4D below corresponds to a permuted extension LDPC code family generated based on 802.11 LDPC code with code block length 648, Z=27 and code rate 5/6. 802.11 LDPC code with code block length n=648, k=540, Z=27 and code rate 5/6 is defined in [Table F-1(d), 802.11REVmdD4.0]. The number of information columns of base PCM is k/Z=20. A family of LDPC codes is obtained by adding 108 (4×27) additional parity bits generated per extension. Table 4D shows the information column indices $f_i = \{f_i(j)\}$ of base PCM at each permuting operation. Combining $f_i = \{f_i(j)\}$ shown in Table 4D and Table F-1(d) in 802.11REVmdD4.0 yields the PCM of PE LDPC codes.

TABLE 4D

Information column indices $f_i = \{f_i(j)\}$ of base PCM of PE codes
at the ith extension of the 802.11 LDPC code (n = 648, rate 5/6):

| i | Rate | 0 | 1 | 2 | 3 | 4 | 5 | 6 | 7 | 8 | 9 | 10 | 11 | 12 | 13 | 14 | 15 | 16 | 17 | 18 | 19 |
|---|------|---|---|---|---|---|---|---|---|---|---|----|----|----|----|----|----|----|----|----|----|
| 0 | 0.833 | | | | | | | | | | | | | | | | | | | | |
| 1 | 0.714 | 7 | 19 | 16 | 1 | 8 | 11 | 9 | 17 | 3 | 14 | 6 | 0 | 2 | 18 | 13 | 10 | 5 | 15 | 12 | 4 |
| 2 | 0.625 | 6 | 17 | 15 | 19 | 18 | 0 | 4 | 11 | 9 | 13 | 7 | 12 | 2 | 5 | 10 | 8 | 3 | 1 | 14 | 16 |
| 3 | 0.556 | 13 | 15 | 12 | 1 | 5 | 7 | 11 | 6 | 19 | 4 | 0 | 3 | 10 | 8 | 9 | 16 | 14 | 2 | 17 | 18 |
| 4 | 0.500 | 3 | 5 | 18 | 13 | 19 | 15 | 17 | 10 | 14 | 12 | 9 | 1 | 8 | 11 | 16 | 7 | 0 | 6 | 2 | 4 |
| 5 | 0.455 | 4 | 3 | 8 | 19 | 18 | 6 | 0 | 16 | 14 | 9 | 2 | 17 | 12 | 7 | 1 | 15 | 5 | 13 | 10 | 11 |
| 6 | 0.417 | 6 | 9 | 14 | 7 | 5 | 15 | 19 | 11 | 17 | 13 | 8 | 2 | 4 | 12 | 3 | 18 | 0 | 10 | 16 | 1 |
| 7 | 0.385 | 7 | 6 | 18 | 19 | 17 | 1 | 4 | 3 | 5 | 11 | 9 | 12 | 15 | 10 | 16 | 0 | 14 | 13 | 8 | 2 |
| 8 | 0.357 | 6 | 14 | 15 | 17 | 1 | 12 | 10 | 5 | 4 | 18 | 19 | 11 | 9 | 13 | 2 | 8 | 3 | 0 | 7 | 16 |
| 9 | 0.333 | 14 | 0 | 12 | 7 | 9 | 1 | 8 | 15 | 2 | 4 | 10 | 13 | 11 | 5 | 18 | 17 | 16 | 19 | 3 | 6 |
| 10 | 0.313 | 5 | 18 | 16 | 7 | 8 | 0 | 19 | 2 | 11 | 12 | 3 | 9 | 1 | 4 | 14 | 6 | 17 | 10 | 13 | 15 |
| 11 | 0.294 | 9 | 13 | 5 | 4 | 17 | 14 | 16 | 3 | 1 | 19 | 7 | 15 | 0 | 8 | 6 | 18 | 2 | 11 | 12 | 10 |
| 12 | 0.278 | 11 | 9 | 0 | 18 | 12 | 2 | 7 | 4 | 1 | 3 | 10 | 15 | 16 | 13 | 19 | 14 | 17 | 5 | 8 | 6 |
| 13 | 0.263 | 12 | 8 | 10 | 13 | 16 | 15 | 11 | 0 | 14 | 1 | 3 | 19 | 4 | 5 | 9 | 18 | 7 | 2 | 6 | 17 |
| 14 | 0.25 | 11 | 5 | 3 | 14 | 17 | 1 | 18 | 9 | 13 | 10 | 19 | 8 | 7 | 6 | 4 | 0 | 16 | 12 | 2 | 15 |
| 15 | 0.238 | 1 | 18 | 3 | 4 | 16 | 9 | 5 | 14 | 11 | 17 | 15 | 13 | 0 | 7 | 2 | 8 | 19 | 6 | 12 | 10 |

Referring again to the LPI range and power extending techniques disclosed above in respect of FIGS. 3 to 9, in example embodiments a family of PE-LDPC codes is used in combination with duplicated data segments within the same PPDU. The LPI DUP-F mode noted above duplicates DCM signals in frequency domain. Therefore, both the lower-half and the upper-half PPDU BW transmit the same signals corresponding the same coded bits.

According an example embodiment, a modified DUP-F mode with PE-LDPC codes will now be disclosed, in which the lower-half PPDU BW and the upper-half PPDU BW carry the same data information, but transmit with different signals corresponding to respective coded bit streams. The different coded bit streams belong, respectively, to a first LDPC code and a permuted extension of the first LDPC code.

Figure 14:
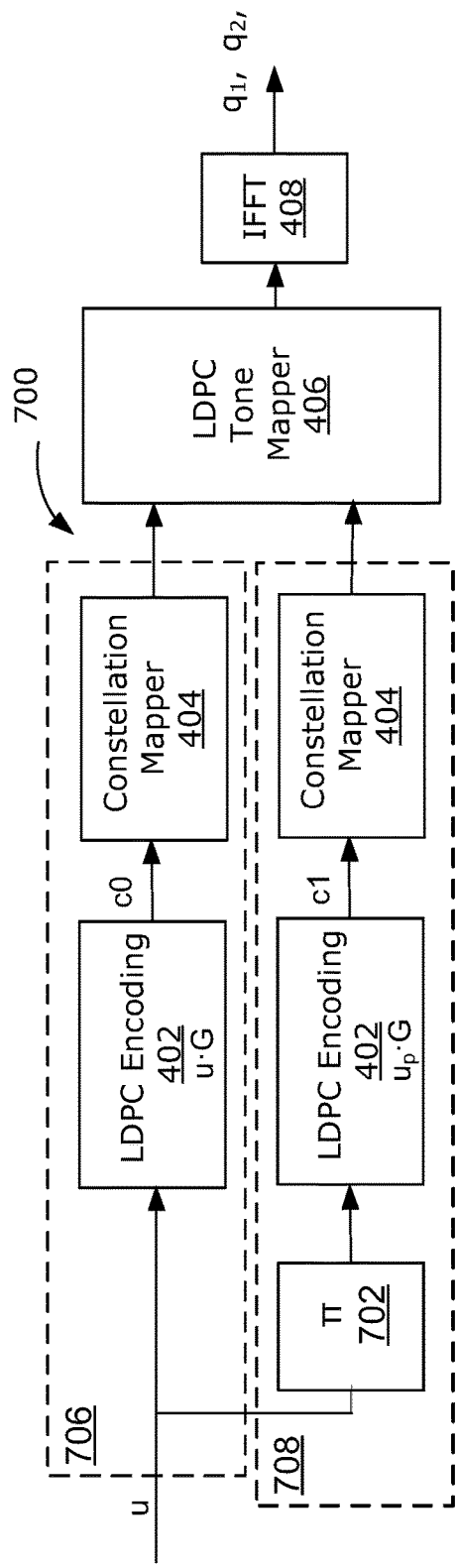
FIG. 14 is an example of an OFDM symbol generator that can be used in a source station of the communication network, according to example embodiments.

FIG. 14 illustrates a block diagram of an OFDM signal generator 700 that is configured to enable a DUP-F mode with PE-LDPC codes. DUP-F mode with PE-LDPC codes requires a separate encoding process for each duplicate copy of data stream, namely one for the original LDPC encoding and one for each additional data stream, with the additional encoding processes each applying a respective PE-LDPC encoding in a manner similar to how respective PE-LDPC encoding is used for successive retransmissions of the same data in a HARQ system.

For simplicity, the OFDM signal generator 700 in FIG. 14 shows only two encoding processes 706 and 708 that respectively apply an original or first LDPC encoding and a second LDPC encoding (PE-LDPC encoding) that is a permuted extension of the first LDPC encoding. However, additional PE-LDPC encoding processes can be included to provide an improved link budget at the cost of data rate.

In example embodiments, the PE-LDPC encoding process 708 may apply the permutation map patterns described above in respect of tables 2A to 4D, based on the base PCM that is used for first LDPC encoding process 706. In the first LDPC encoding process 706, the original source word u is provided to a respective LDPC encoding operation 402. LDPC encoding operation 402 applies generator matrix G to original source word u to generate a first codeword c0. In the second LDPC encoding process 708 (i.e. PE-LDPC encoding process), the original source word u is first subjected to a permuting operation 702 wherein its bits are interleaved according to permutation map n. The resulting permuted source word up is then provided to a respective LDPC encoding operation 402, which in turn applies the same generator matrix G to the permuted source word Up to generate a second codeword c1. The identical LDPC encoding operation 402 (i.e., the same generator matrix G) is applied to the original source word u and the permuted source word $u_p$. First codeword c0 and second codeword c1 will each include the same information bits, but in a different orders, and furthermore will each include different parity check bits. It will be noted that for systematic LDPC codes such as existing Wi-Fi LDPC codes, the information bit portion of the PE-LDPC codeword (codeword c1) can, subsequent to LDPC encoding 402, be replaced with the information bits in the same order as the original source word u, or the interleaved version of the information bits (e.g., $u_p$) may be retained in codeword c1.

Each of the respective codewords c0 and c1 are subjected to DCM constellation mapping in a similar manner as described above in respect of FIG. 8. For the present description, a data segment s in the context of OFDM signal generator 700 is deemed to be the same size as the data segments s of the preceding embodiments. In this regard, in LDPC encoding process 706, a data segment s0($i$) from codeword c0 is divided into a first half segment s0($i$)/$2_1$ and a second half segment s0($i$)/$2_2$. Constellation mapper 404 applies DCM to map the first half data segment s0($i$)/$2_1$ to a first set of sub-carriers, and a phase-rotated copy of the first half data segment, s0($i$)'/$2_1$, to a second set of subcarriers that collectively correspond to half of the PPDU BW of a first OFDM symbol $q_1$. Constellation mapper 404 applies DCM to map the second half data segment s0($i$)/$2_2$ to a first set of sub-carriers, and a phase-rotated copy of the second half data segment, s0($i$)'/$2_2$, to a second set of subcarriers that collectively correspond to half of the PPDU BW of a second OFDM symbol $q_2$.

Similarly, in LDPC encoding process 706, a data segment s1($i$) from codeword c1 is divided into a first half segment s1($i$)/$2_1$ and a second half segment s1($i$)/$2_2$. Constellation mapper 404 applies DCM to map the first half data segment s1($i$)/$2_1$ to a first set of sub-carriers, and a phase-rotated copy of the first half data segment, s1($i$)'/$2_1$, to a second set of subcarriers that collectively correspond to a further half of the PPDU BW of first OFDM symbol $q_1$. Constellation mapper 404 applies DCM to map the second half data segment s1($i$)/$2_2$ to a first set of sub-carriers, and a phase-rotated copy of the second half data segment, s1($i$)'/$2_2$, to a second set of subcarriers that collectively correspond to further half of the PPDU BW of second OFDM symbol $q_2$.

At LDPC tone mapper 406, the first half data segments s0($i$)/$2_1$ and s0($i$)'/$2_1$ corresponding to the first LDPC encoded codeword c0, together with the first half data segments s1($i$)/$2_1$ and s1($i$)'/$2_1$ corresponding to the PE-LDPC encoded codeword c1 are collectively mapped to respective sets of OFDM subcarriers that correspond to the first OFDM symbol $q_1$, and then provided to IFFT operation 408 to generate OFDM symbol $q_1$.

The second half data segments s0($i$)/$2_2$ and s0($i$)'/$2_2$ corresponding to the first LDPC encoded codeword c0, together with the second half data segment s1($i$)/$2_2$ and s1($i$)'/$2_2$ corresponding to the PE-LDPC encoded codeword $c_1$ are collectively mapped to respective sets of OFDM subcarriers that correspond to the second OFDM symbol $q_2$, and then provided to IFFT operation 408 to generate OFDM symbol $q_2$.

Figure 15:
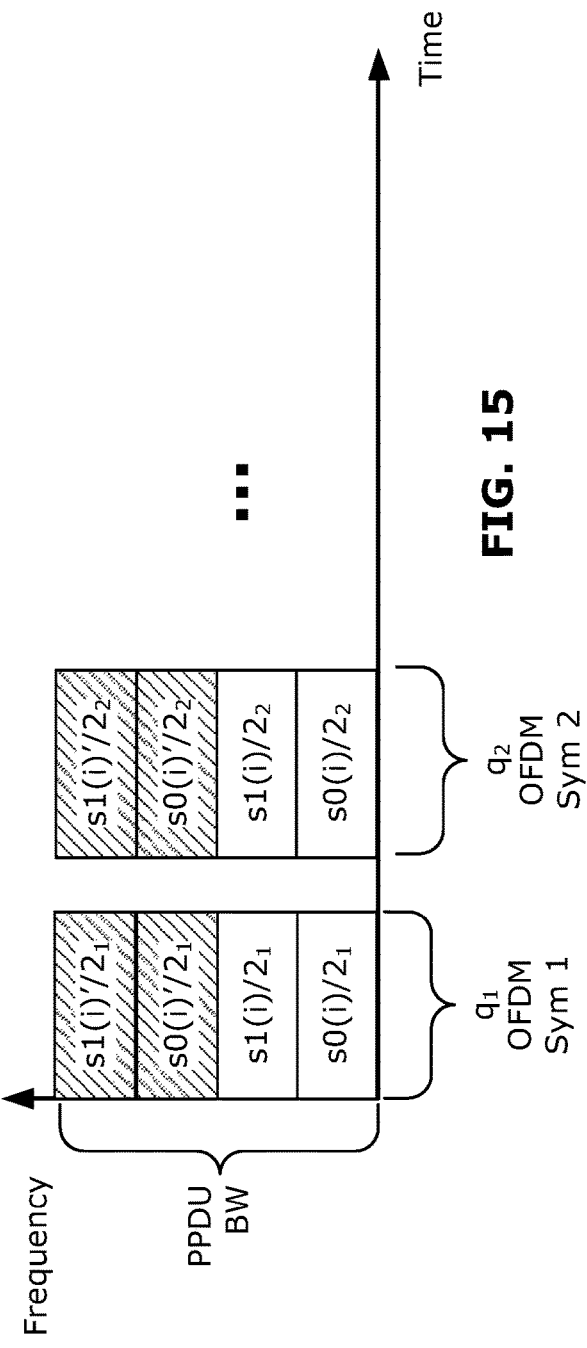
FIG. 15 is a frequency-time plot showing an example of OFDM symbols generated by the OFDM symbol generator of FIG. 14.

In the illustrated embodiment, as seen in FIG. 15, in OFDM symbol $q_1$, first half data segment s0($i$)/$2_1$ occupies subcarriers associated with a first quarter of the PPDU BW, first half data segment s1($i$)/$2_1$ occupies subcarriers associated with a second quarter of the PPDU BW, phase rotated first half data segment s0($i$)'/$2_1$ occupies subcarriers associated with a third quarter of the PPDU BW, and first half phase rotated data segment s1($i$)'/$2_1$ occupies subcarriers associated with a fourth quarter of the PPDU BW. Accordingly, the data segments from the first LDPC encoding and the PE-LDPC encoding alternate with each other in frequency domain within an OFDM symbol, providing additional frequency diversity.

At a destination station, the log-likelihood ratio (LLR) values of information bits in the original LDPC coded stream and the PE-LDPC coded stream transmitted through the lower-half and upper-half PPDU BW can be combined, and layered LDPC decoding can be performed by using the LDPC decoder for the original LDPC code with an additional deinterleaving of LLRs of information bits based on the received parity bits generated by PE-LDPC encoding in LDPC decoding.

The use of incremental PE-LDPC encoding can also be applied in an alternative DUP-T mode implementation, according to example embodiments. In the above described DUP-T mode an OFDM symbol is duplicated in time domain. In the case of a single duplication of the OFDM symbol, the transmitted PPDU payload will include an original OFDM symbol, followed by its duplicate, both of which transmit the same signals corresponding the same coded bits. Thus, the PPDU payload will include a series of alternating and original and duplicate OFDM symbols.

Figure 16:
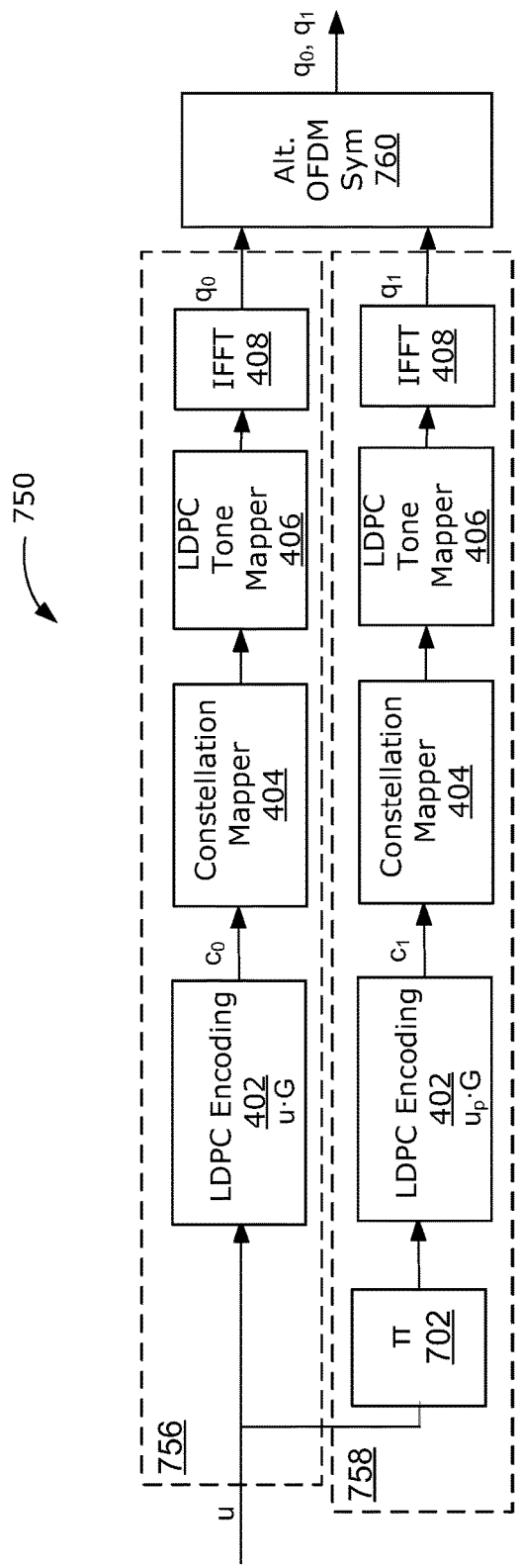
FIG. 16 is an example of an OFDM symbol generator that can be used in a source station of the communication network, according to example embodiments.
Figure 17:
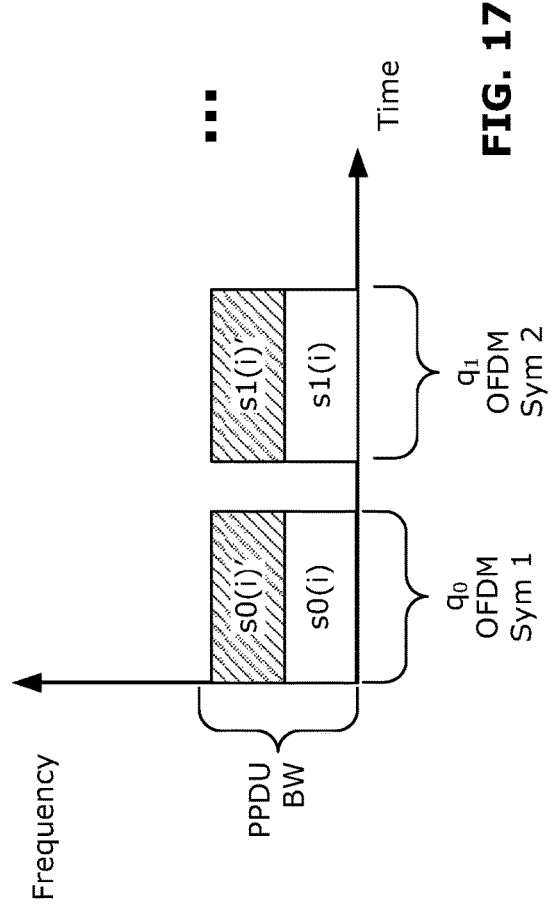
FIG. 17 is a frequency-time plot showing an example of OFDM symbols generated by the OFDM symbol generator of FIG. 16.

An example embodiment of DUP-T mode with PE-LDPC codes will now be described in which a first OFDM symbol and following second OFDM symbol carry the same data information, but transmit using different signals corresponding the respective coded bit streams. The differently coded bit streams can be implemented using the original LDPC codes and the permuted extension of the original LDPC codes as described above in respect of IR-HARQ retransmissions. FIG. 16 shows a logical block diagram of an OFDM signal generator 750 for implementing DUP-T with PE-LDPC codes. Similar to the DUP-F mode with PE-LDPC codes embodiment described in respect of FIGS. 14 and 15, the DUP-T mode with PE-LDPC OFDM symbol generator 750 also requires two LDPC encoding processes 756, 758. A first LDPC encoding process 756 applies a first LDPC encoding, corresponding to an original or first LDPC code, to a source word u. The second LDPC encoding process 758 applies a second LDPC encoding, corresponding to a PE-LDPC code that is a permuted extension of the original LDPC code, to the source word u.

As shown in FIG. 16, first LDPC encoding process 756 includes LDPC encoding operation 402, which applies generator matrix G to original source word u to generate a first codeword c0. In the second LDPC encoding process 758 (i.e. PE-LDPC encoding process), the original source word u is first subjected to a permuting operation 702 wherein its bits are interleaved according to permutation map n. The resulting permuted source word up is then provided to a respective LDPC encoding operation 402, which in turn applies the same generator matrix G to the permuted source word up to generate a second codeword c1. The identical LDPC encoding operation 402 (i.e., the same generator matrix G) is applied to the original source word u and the permuted source word up. First codeword c0 and second codeword c1 will each include the same information bits, but in a different orders, and furthermore will each include different parity check bits.

Each of the respective codewords c0 and $c_1$ are subjected to DCM constellation mapping in a similar manner as described above in respect of FIG. 4. The constellation mapper 404 of first LDPC encoding process 756 applies DCM to map a data segment s0($i$) from codeword c0 to a first set of sub-carriers, and a phase-rotated copy of the data segment, s0($i$)' to a second set of subcarriers that collectively correspond to the PPDU BW.

Similarly, in LDPC encoding process 758, a data segment s1($i$) from codeword c1 is provided to constellation mapper 404, which applies DCM to map the data segment s1($i$) to a first set of sub-carriers, and a phase-rotated copy of the data segment, s1($i$)', to a second set of subcarriers that collectively correspond to the PPDU BW.

At LDPC tone mapper 406 of first LDPC encoding process 756, the data segments s0($i$) and s0($i$)' corresponding to the first LDPC encoded codeword c0 are mapped to OFDM subcarriers that correspond to a first OFDM symbol $q_0$, and then provided to IFFT operation 408 to generate OFDM symbol $q_0$.

At LDPC tone mapper 406 of the second LDPC encoding process 758, the data segments s1($i$) and s1($i$)' corresponding to the PE-LDPC encoded codeword c1 are mapped to OFDM subcarriers that correspond to a second OFDM symbol $q_1$, and then provided to IFFT operation 408 to generate OFDM symbol $q_1$.

As indicated by block 760, The OFDM generator 750 includes is configured to alternately output OFDM symbols from the first and second LDPC encoding processes 756, 758, to provide a serial sequence of OFDM symbols q0, q1, etc., for the payload of an PPDU.

At a destination station, the log-likelihood ratio (LLR) values of information bits in the original LDPC coded stream and the PE-LDPC coded stream transmitted through adjacent two OFDM symbols $q0^T$, $q1^T$, can be combined, and layered LDPC decoding can be performed by using the LDPC decoder for the original LDPC code with an additional deinterleaving process on LLRs of information bits when involving the received parity bits generated by PE-LDPC encoding in LDPC encoding.

Figure 18:
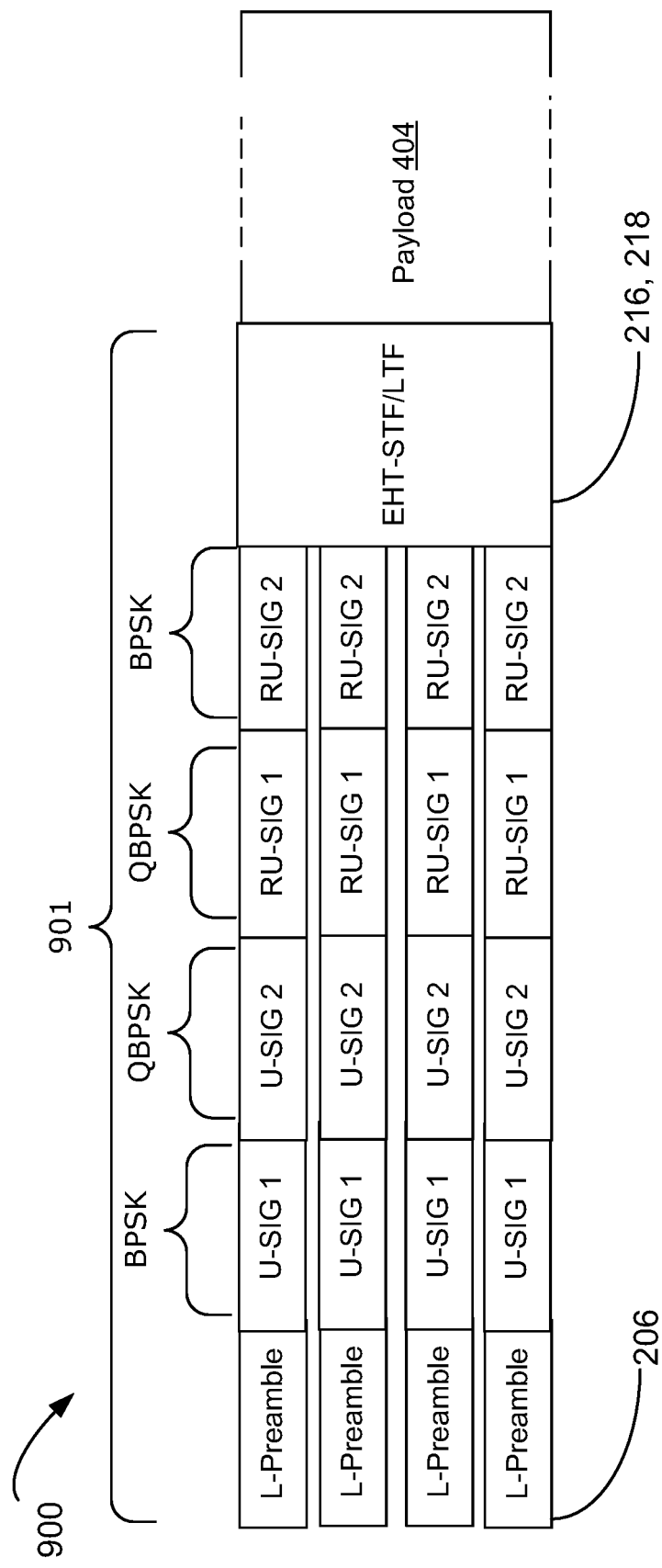
FIG. 18 shows an example of a data unit that can be used to carry information in the communication network of FIG. 1 according to example embodiments.

The PPDU 200 described above in respect of FIG. 3 is one example of a possible PPDU frame format. Reliable auto-detection of the PPDU preamble portion is an important aspect of LPI transmissions. Further example embodiments are directed towards frame preamble structures that can improve auto-detection performance in LPI environments. FIG. 18 shows a frame format for an EHT LPI PPDU 900 according to a further example embodiment, that may be used for wide BW LPI LR communication. As illustrated, PPDU 900 includes preamble 901 and payload portion 404. Preamble 901 includes legacy preamble field 206, which as described above is configured for backward compatibility and coexistence with legacy IEEE 802.11 devices.

An EHT portion of the preamble 901 includes fields for: U-SIG 1, U-SIG 2, RU-SIG 1, RU-SIG 2, EHT-STF 216, and EHT-LTF 218. In some embodiments, the signals included in preamble portion 901, excluding EHT-STF 216, EHT-LTF 218, are repeated in frequency domain, for example every 20 MHz.

In example embodiments, U-SIG 1 and U-SIG 2 each encode different information. The information may be of the types described above in respect of U-SIG 212 of PPDU 200. RU-SIG-1 carries the same information as U-SIG 1, and RU-SIG-2 carries the same information as U-SIG 2. U-SIG 1, U-SIG 2, RU-SIG 1, and RU-SIG 2 are each transmitted using a different respective OFDM symbol, and each may be copied in frequency domain within its respective OFDM symbol. For example, in the PPDU 900 illustrated in FIG. 18, four copies of U-SIG 1 are included in its respective OFDM symbol.

In example embodiments, when encoding preamble 901, a source station is configured to apply different constellation mapping schemes when encoding the bit information content for U-SIG 1, U-SIG 2, RU-SIG 1, and RU-SIG 2. In the in the PPDU 900 illustrated in FIG. 18, U-SIG 1 content is encoded using binary phase shift keying (BPSK); U-SIG 2 content is encoded using quadrature binary phase shift keying (QBPSK); RU-SIG 1 content is encoded using quadrature binary phase shift keying (QBPSK); and RU-SIG 2 content is encoded using binary phase shift keying (BPSK).

Figure 19:
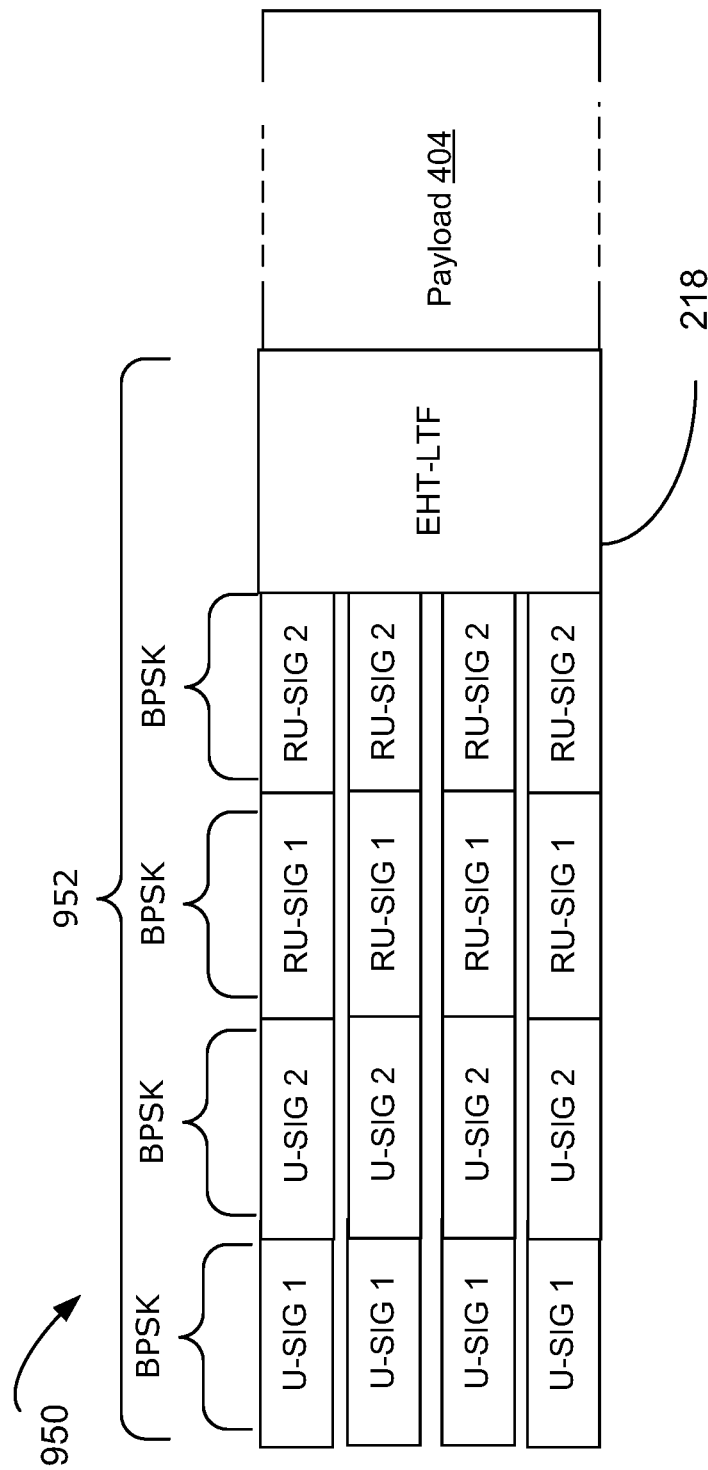
FIG. 19 shows a further example of a data unit that can be used to carry information in the communication network of FIG. 1 according to example embodiments.

FIG. 19 shows yet a further frame format for an EHT LPI PPDU 950 according to a further example embodiment that may be used for wide BW LPI LR communication. As illustrated, PPDU 950 has a greenfield format that eliminates any fields that are not specifically required for an EHT LPI enabled destination station. In this regard, PPDU 950 does not include legacy preamble fields L-preamble/RL-SIG, and also does not include an EHT-STF field. Rather, EHT LPI PPDU 950 is limited to no more than the following fields: U-SIG 1, U-SIG 2, RU-SIG 1, RU-SIG 2, EHT-LTF 218, and payload 404. As in PPDU 900, U-SIG 1 and U-SIG 2 of PPDU 950 each encode different information that may be of the types described above in respect of U-SIG 212 of PPDU 200. RU-SIG-1 carries the same information as U-SIG 1, and RU-SIG-2 carries the same information as U-SIG 2. U-SIG 1, U-SIG 2, RU-SIG 1, and RU-SIG 2 are each transmitted using a different respective OFDM symbol, and each may be copied in frequency domain within its respective OFDM symbol. In at least some example embodiments, the content for all of U-SIG 1, U-SIG 2, RU-SIG 1, and RU-SIG 2 of PPDU 900 are BPSK encoded. In other example embodiments, different constellations mapping schemes may be used for the repeated signals (RU-SIG 1, and RU-SIG 2) from what is respectively used for the original signals (U-SIG 1 and SIG-2), such as described above in respect of PPDU 900.

The present disclosure provides certain example algorithms and calculations for implementing examples of the disclosed methods and systems. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
    encoding a source word to be transmitted in a data unit from a source station in a wireless network;
    mapping encoded bits of the source word to both a first set of modulated symbols and a second set of modulated symbols, the encoded bits of the source word corresponding to a data segment;
    duplicating the first set of modulated symbols and the second set of modulated symbols to provide a third set of modulated symbols and a fourth set of modulated symbols, wherein all four sets of modulated symbols each respectively compose the data segment, with effect that the four sets of modulated symbols include four copies of the same bit information of the source word;
    mapping the first set of modulated symbols to a first set of frequency subcarriers corresponding to the first OFDM symbol, mapping the second set of modulated symbols to a second set of frequency subcarriers corresponding to the first OFDM symbol, mapping the third set of modulated symbols to a third set of frequency subcarriers corresponding to the first OFDM symbol and mapping the fourth set of modulated symbols to a fourth set of frequency subcarriers corresponding to the first OFDM symbol;
    performing an inverse Fast Fourier transform operation on the frequency subcarriers to generate a first OFDM symbol that carries the data segment; and
    transmitting the data unit including the first OFDM symbol.

2. The method of claim 1 wherein mapping the encoded bits comprises applying a phase rotation to the second set of modulated symbols relative to the first set of modulated symbols.

3. A system comprising a processor configured to perform the method of claim 1.

4. The method of claim 1, further comprising:
    duplicating the first OFDM symbol to generate a second OFDM symbol that is a linear phase-rotated copy of the first OFDM symbol; and
    transmitting the data unit including the first OFDM symbol and the second OFDM symbol.

5. An apparatus for processing data for transmission in a wireless network, comprising a processing device and memory storing instructions that when executed by the processing device cause the apparatus to:
    encode a source word to be transmitted in a data unit from a source station in the wireless network;
    map encoded bits of the source word to both a first set of modulated symbols and a second set of modulated symbols;
    duplicate the first set of modulated symbols and the second set of modulated symbols to provide a third set of modulated symbols and a fourth set of modulated symbols, wherein all four sets of modulated symbols each respectively compose the data segment, with effect that the four sets of modulated symbols include four copies of the same bit information of the source word;
    map the first set of modulated symbols to a first set of frequency subcarriers corresponding to the first OFDM symbol, map the second set of modulated symbols to a second set of frequency subcarriers corresponding to the first OFDM symbol, map the third set of modulated symbols to a third set of frequency subcarriers corresponding to the first OFDM symbol and map the fourth set of modulated symbols to a fourth set of frequency subcarriers corresponding to the first OFDM symbol;
    perform an inverse Fast Fourier transform operation on the frequency subcarriers to generate a first OFDM symbol that carries the data segment; and
    transmit the data unit including the first OFDM symbol.

6. The apparatus of claim 5, wherein mapping the encoded bits comprises applying a phase rotation to the second set of modulated symbols relative to the first set of modulated symbols.

7. The apparatus of claim 5, wherein the instructions further cause the apparatus to:
    duplicate the first OFDM symbol to generate a second OFDM symbol that is a linear phase-rotated copy of the first OFDM symbol; and
    transmit the data unit including the first OFDM symbol and the second OFDM symbol.

8. A non-transitory computer readable medium storing instructions for configuring a processing system to perform a method of processing data for transmission in a wireless network, the method comprising:
    encoding a source word to be transmitted in a data unit from a source station in the wireless network;
    mapping encoded bits of the source word to both a first set of modulated symbols and a second set of modulated symbols;
    duplicating the first set of modulated symbols and the second set of modulated symbols to provide a third set of modulated symbols and a fourth set of modulated symbols, wherein all four sets of modulated symbols each respectively compose the data segment, with effect that the four sets of modulated symbols include four copies of the same bit information of the source word;
    mapping the first set of modulated symbols to a first set of frequency subcarriers corresponding to the first OFDM symbol, mapping the second set of modulated symbols to a second set of frequency subcarriers corresponding to the first OFDM symbol, mapping the third set of modulated symbols to a third set of frequency subcarriers corresponding to the first OFDM symbol and mapping the fourth set of modulated symbols to a fourth set of frequency subcarriers corresponding to the first OFDM symbol;

performing an inverse Fast Fourier transform operation on the frequency subcarriers to generate a first OFDM symbol that carries the data segment; and transmitting the data unit including the first OFDM symbol.

* * * * *